United States Patent
Gysling et al.

(10) Patent No.: US 7,623,976 B2
(45) Date of Patent: Nov. 24, 2009

(54) SYSTEM OF DISTRIBUTED CONFIGURABLE FLOWMETERS

(75) Inventors: Daniel L. Gysling, Glastonbury, CT (US); Alan D. Kersey, South Glastonbury, CT (US); F. Kevin Didden, Wallingford, CT (US)

(73) Assignee: CiDRA Corporate Services, Inc., Wallingford, CT (US)

( * ) Notice: Subject to any disclaimer, the term of this patent is extended or adjusted under 35 U.S.C. 154(b) by 204 days.

(21) Appl. No.: 10/875,858

(22) Filed: Jun. 24, 2004

(65) Prior Publication Data
US 2005/0011258 A1    Jan. 20, 2005

Related U.S. Application Data

(60) Provisional application No. 60/482,264, filed on Jun. 24, 2003, provisional application No. 60/487,765, filed on Jul. 15, 2003, provisional application No. 60/487,678, filed on Jul. 15, 2003.

(51) Int. Cl.
*G01N 11/00* (2006.01)

(52) U.S. Cl. .................... 702/47; 702/45; 702/50; 702/100; 702/104

(58) Field of Classification Search ............. 702/45–48, 702/100, 50; 73/861.42, 861.08, 861.44, 73/49.5, 53.01
See application file for complete search history.

(56) References Cited

U.S. PATENT DOCUMENTS

| | | | | |
|---|---|---|---|---|
| 4,048,853 A | 9/1977 | Smith et al. | ............... | 73/861.25 |
| 4,080,837 A | 3/1978 | Alexander et al. | ......... | 73/61.45 |
| 4,248,085 A | 2/1981 | Coulthard | ................ | 73/861.06 |
| 4,445,389 A | 5/1984 | Potzick et al. | ........... | 73/861.27 |
| 4,896,540 A | 1/1990 | Shakkottai et al. | ....... | 73/861.02 |
| 5,040,415 A | 8/1991 | Barkhoudarian | ......... | 73/861.03 |
| 5,083,452 A | 1/1992 | Hope | .......................... | 73/61 R |
| 5,218,197 A | 6/1993 | Carroll | .................. | 250/227.19 |
| 5,285,675 A | 2/1994 | Colgate et al. | ............... | 73/23.2 |

(Continued)

FOREIGN PATENT DOCUMENTS

WO    WO 93/14382    7/1993

(Continued)

OTHER PUBLICATIONS

"Noise and Vibration Control Engineering Principles and Applications", Leo L. Beranek and Istvan L. Ver, A. Wiley Interscience Publication, pp. 537-541, Aug. 1992.

(Continued)

*Primary Examiner*—Drew A Dunn
*Assistant Examiner*—Hien X Vo

(57) ABSTRACT

A system of one or more configurable flowmeters allows an individual, locally or remotely, to selectively activate one or more functions of the flowmeters. The individual is capable of selecting which parameter of the process flow that the flowmeter is to measure, thereby effectively providing latent functions that may be selectively brought on line or shut off. The system may also allow an individual, locally or remotely, to selectively activate one or more latent flowmeters in the system. The system may be a distributed control system (DCS), which receives input signals from conventional meters and devices in the process flow and provides control signals to one or more devices in the flow process. The system may also provide a method of flowmeter selection and billing.

46 Claims, 16 Drawing Sheets

U.S. PATENT DOCUMENTS

| | | | | |
|---|---|---|---|---|
| 5,367,911 | A | 11/1994 | Jewell et al. | 73/861.08 |
| 5,398,542 | A | 3/1995 | Vasbinder | 73/40.5 |
| 5,524,475 | A | 6/1996 | Kolpak et al. | 73/19.03 |
| 5,526,844 | A | 6/1996 | Kamen et al. | 137/614.11 |
| 5,591,922 | A | 1/1997 | Segeral et al. | 73/861.04 |
| 5,741,980 | A | 4/1998 | Hill et al. | 73/861.04 |
| 5,770,805 | A | 6/1998 | Castel | 73/861.04 |
| 5,770,806 | A | 6/1998 | Hiismaki | 73/861.29 |
| 5,835,884 | A | 11/1998 | Brown | 73/861.04 |
| 5,845,033 | A | 12/1998 | Berthold et al. | 385/12 |
| 5,948,959 | A | 9/1999 | Peloquin | 73/1.83 |
| 6,012,897 | A | 1/2000 | Gysling et al. | 73/705 |
| 6,151,958 | A | 11/2000 | Letton et al. | 73/61.79 |
| 6,202,494 | B1 | 3/2001 | Ricbel et al. | 73/861.29 |
| 6,354,147 | B1 | 3/2002 | Gysling et al. | 73/61.79 |
| 6,378,357 | B1 | 4/2002 | Han et al. | 73/54.41 |
| 6,435,030 | B1 | 8/2002 | Gysling et al. | 73/587 |
| 6,463,813 | B1 | 10/2002 | Gysling | 73/862.59 |
| 6,536,291 | B1 | 3/2003 | Gysling et al. | 73/861.42 |
| 6,550,342 | B2 | 4/2003 | Croteau et al. | 73/800 |
| 6,587,798 | B2 | 7/2003 | Kersey et al. | 702/50 |
| 6,601,458 | B1 | 8/2003 | Gysling et al. | 73/861.04 |
| 6,609,069 | B2 * | 8/2003 | Gysling | 702/48 |
| 6,691,584 | B2 | 2/2004 | Gysling et al. | 73/861.42 |
| 6,698,297 | B2 | 3/2004 | Gysling | |
| 6,732,575 | B2 | 5/2004 | Gysling et al. | 73/61.79 |
| 6,782,150 | B2 | 8/2004 | Davis et al. | 385/12 |
| 6,813,962 | B2 | 11/2004 | Gysling et al. | 73/861.26 |
| 6,837,098 | B2 | 1/2005 | Gysling et al. | 73/61.79 |
| 6,862,920 | B2 | 3/2005 | Gysling et al. | |
| 6,945,095 | B2 | 9/2005 | Johansen | 73/861.18 |
| 7,139,667 | B2 * | 11/2006 | Rothman et al. | 702/50 |
| 2002/0123852 | A1 | 9/2002 | Gysling et al. | |
| 2002/0129662 | A1 | 9/2002 | Gysling et al. | |
| 2002/0193144 | A1 | 12/2002 | Belski et al. | 455/557 |
| 2003/0038231 | A1 | 2/2003 | Bryant et al. | |
| 2003/0066359 | A1 | 4/2003 | Gysling et al. | 73/861.23 |
| 2003/0136186 | A1 | 7/2003 | Gysling et al. | |
| 2003/0154036 | A1 | 8/2003 | Gysling et al. | |
| 2004/0016284 | A1 | 1/2004 | Gysling et al. | |
| 2004/0069069 | A1 | 4/2004 | Croteau | |
| 2004/0074312 | A1 | 4/2004 | Gysling | |
| 2004/0144182 | A1 | 7/2004 | Gysling et al. | |
| 2004/0167735 | A1 | 8/2004 | Gysling et al. | |
| 2004/0168522 | A1 | 9/2004 | Bailey et al. | |
| 2004/0168523 | A1 | 9/2004 | Bailey et al. | |
| 2004/0194539 | A1 | 10/2004 | Gysling | |
| 2004/0199340 | A1 | 10/2004 | Gysling et al. | |
| 2004/0199341 | A1 | 10/2004 | Gysling et al. | |
| 2004/0210404 | A1 | 10/2004 | Gysling et al. | |
| 2004/0231431 | A1 | 11/2004 | Bailey et al. | |
| 2004/0255695 | A1 | 12/2004 | Gysling et al. | |
| 2005/0005711 | A1 | 1/2005 | Curry et al. | |
| 2005/0011283 | A1 | 1/2005 | Gysling et al. | |
| 2005/0011284 | A1 | 1/2005 | Davis et al. | |
| 2005/0125166 | A1 | 6/2005 | Davis et al. | |

FOREIGN PATENT DOCUMENTS

| | | |
|---|---|---|
| WO | WO 99/67629 | 12/1999 |
| WO | WO 0102811 | 1/2001 |

OTHER PUBLICATIONS

"Two Decades of Array Signal Processing Research", The Parametric Approach, H. Krim and M. Viberg, IEEE Signal Processing Magazine, Jul. 1996, pp. 67-94.

"Development of an array of pressure sensors with PVDF film, Experiments in Fluids 26", Jan. 8, 1999, Springer-Verlag.

"Viscous Attenuation of Acoustic Waves in Suspensions" by R.L. Gibson, Jr. and M.N. Toksoz.

Sonar-Based Volumetric Flow Meter for Pulp and Paper Applications—By: Daniel L. Gysling & Douglas H. Loose—Dec. 3, 2002.

Sonar Based Volumetric Flow Meter for Chemical and Petrochemical Applications—By: Daniel L. Gysling & Douglas H. Loose—Feb. 14, 2003.

Sonar Based Volumetric Flow and Entrained Air Measurement for Pulp and Paper Applications—By: Daniel L. Gysling & Douglas H. Loose—Jan. 24, 2003.

* cited by examiner

SYSTEM OF DISTRIBUTED CONFIGURABLE FLOWMETERS

CROSS-REFERENCE-TO RELATED APPLICATIONS

This application claims the benefit of U.S. Provisional Patent Application No. 60/482,264 filed Jun. 24, 2003, U.S. Provisional Patent Application No. 60/487,765 filed Jul. 15, 2003, and U.S. Provisional Patent Application No. 60/487, 678 filed Jul. 15, 2003, all of which are incorporated by reference herein in their entirety.

TECHNICAL FIELD

The present disclosure relates to fluid flowmeters and, more particularly, to a system of distributed, configurable fluid flowmeters.

BACKGROUND

A fluid flow process (flow process) includes any process that involves the flow of fluid through pipes, ducts, or other conduits, as well as through fluid control devices such as pumps, valves, orifices, heat exchangers, and the like. Flow processes are found in many different industries such as the oil and gas industry, refining, food and beverage industry, chemical and petrochemical industry, pulp and paper industry, power generation, pharmaceutical industry, and water and wastewater treatment industry. The fluid within the flow process may be a single phase fluid (e.g., gas, liquid or liquid/liquid mixture) and/or a multi-phase mixture (e.g. paper and pulp slurries or other solid/liquid mixtures). The multi-phase mixture may be a two-phase liquid/gas mixture, a solid/gas mixture or a solid/liquid mixture, gas entrained liquid or a three-phase mixture.

Various sensing technologies exist for measuring various physical parameters of single and/or multiphase fluids in an industrial flow process. Such physical parameters include, for example, volumetric flow rate, composition, consistency, density, and mass flow rate.

In certain sensing applications, such as in industrial flow processes, it may be desirable to sense different parameters, the same parameter, or different locations, at different times throughout the industrial flow process. For example, it may initially be desirable to sense volumetric flow rate at a single or limited number of locations throughout an industrial flow process when plant first comes on line. Later, it may be desirable to sense volumetric flow rates at different locations in the process on a distributed basis throughout the process. Alternatively, it may be desirable to sense different parameters of interest at a later time, such as composition, density, and mass flow rate.

From a plant operator's standpoint, it is undesirable to pay for information that is not needed. Therefore, the operator may be willing to pay a premium for certain information at different times, and other different information at a later time. However, it may be extremely costly to intervene or install a meter or measuring device at the later time because of lost production or difficulty in installing a meter at the later time, particularly in harsh environments.

SUMMARY OF THE INVENTION

The above-described and other needs are met by a system of distributed selectable latent flowmeters. The system comprises a plurality of sensor heads and at least one signal processor connected to the plurality of sensor heads. Each of the sensor heads comprises an array of sensors disposed axially along a pipe, and each of the sensor heads provides pressure signals representative of unsteady pressures within a fluid flowing in the pipe. The at least one signal processor provides an output signal indicative of at least one parameter determined from the pressure signals from selected ones of the plurality of sensor heads. The at least one signal processor may select the selected ones of the plurality of sensor heads based on a selection signal. The at least one parameter includes may include: density of the fluid, volumetric flow rate of the fluid, mass flow rate of the fluid, composition of the fluid, entrained air in the fluid, consistency of the fluid, size of particles in the fluid, and health of a device causing the unsteady pressures to be generated in the pipe.

A status of the selection signal may be determined based on whether a user desires to retrieve the output signal, and it may be determined based on whether a user will pay for the output signal. The status of the selection signal may be provided from a location remote from the at least one signal processor, and the output signal may be provided to a location remote from the at least one signal processor.

A user of the system may be charged a fee based at least in part on the selected ones of the plurality of sensor heads and/or the output signal.

The at least one signal processor may include at least one first signal processor connected to the plurality of sensor heads, the at least one first signal processor determines the at least one parameter; and a second signal processor that selects the selected ones of the plurality of sensor heads based on the selection signal. In response to the at least one parameter, the second signal processor may provide a control signal to a device through which the fluid flows.

In one aspect of the invention the at least one parameter is selected from a plurality of parameters determined from the pressure signals. The at least one signal processor may select the at least one parameter based on a selection signal. The user of the system may be charged a fee based at least in part on the at least one parameter selected.

In another aspect of the invention, a method of paying for data indicative of parameters of a flow process comprises: installing a plurality sensor heads in the flow process, each of the sensor heads comprising an array of sensors disposed axially along a pipe, and each of the sensor heads providing pressure signals representative of unsteady pressures within a fluid flowing in the pipe; providing data to a user, the data being determined from the pressure signals from selected ones of the sensor heads; and charging the user a fee based at least in part on the selected ones of the sensor heads. The method may further comprise selecting the selected ones of the sensor heads based on a selection signal. The fee may further be based on one or more of the number of sensor heads selected, the amount of data retrieved by the user, and the length of time data is retrieved by the user. The fee may further be based on one or more of the number of sensor heads selected, the amount of data retrieved by the user, and the length of time data is retrieved by the user.

In another aspect of the invention, the data associated with the selected ones of the sensor heads is indicative of at least one parameter of the flow process, with the at least one parameter being selected from a plurality of parameters determined from the pressure signals from the selected ones of the sensor heads. In this embodiment, the fee may be based at least in part on the at least one parameter selected.

The foregoing and other objects, features and advantages of the present invention will become more apparent in light of the following detailed description of exemplary embodiments thereof.

DETAILED DESCRIPTION

Figure 1:
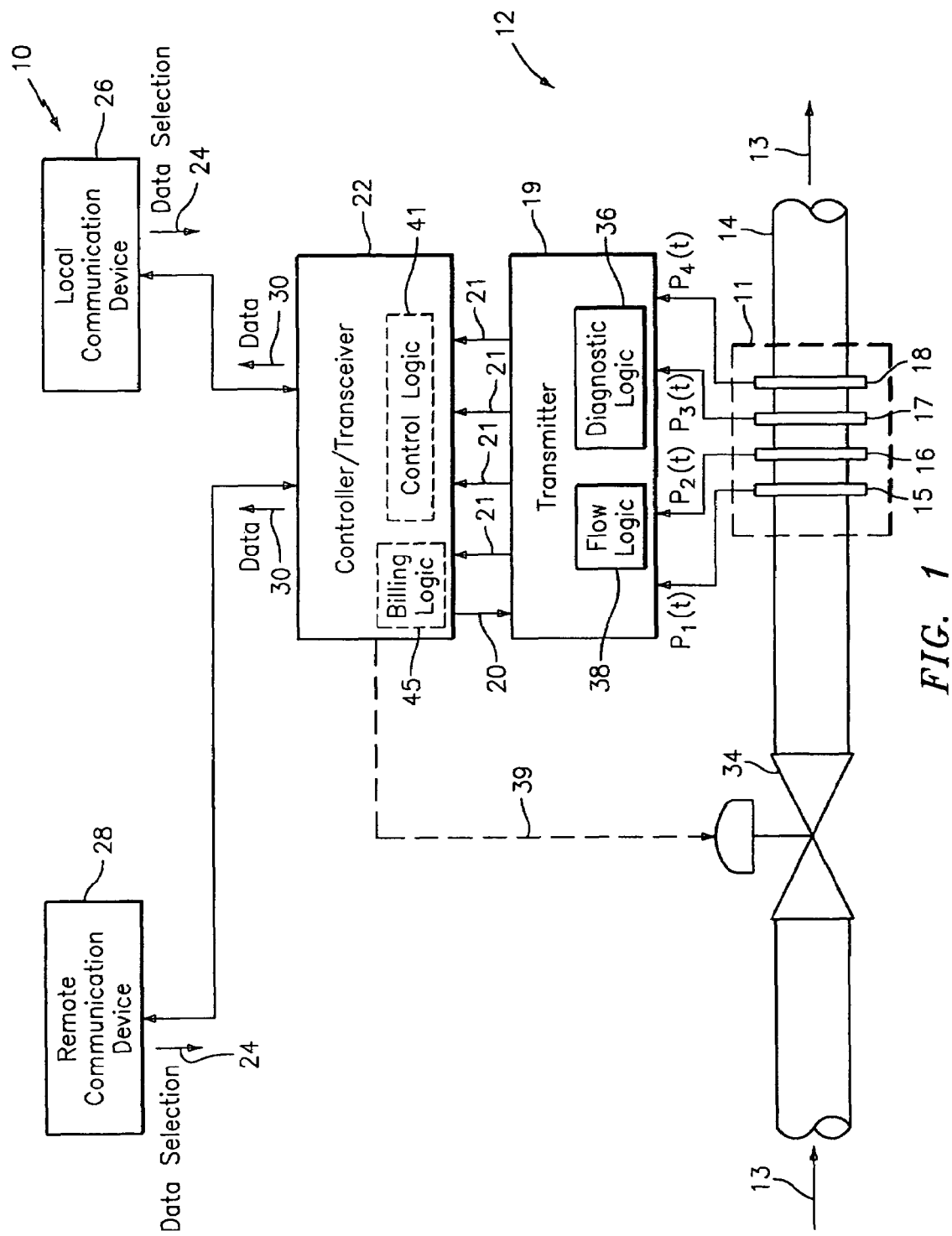
FIG. 1 is a schematic diagram of a system including a configurable flowmeter, in accordance with an embodiment of the present invention.

Referring to FIG. 1, a system 10 of one or more configurable flowmeters 12 allows an individual, locally or remotely, to selectively activate one or more functions of the flowmeter 12. In other words, an individual is capable of selecting which parameter of the process flow that the flowmeter 12 is to measure, thereby effectively providing latent functions that may be selectively brought on line or shut off. The system 10 also allows an individual, locally or remotely, to selectively activate one or more latent flowmeters 12 in the system. The system 10 of configurable flowmeters 12 may be a distributed control system (DCS), which receives input signals from conventional meters and devices in the process flow. The system 10 also provides a method of flowmeter selection and billing. Each of these aspects of the present invention is described in further detail hereinafter.

Referring to FIG. 1, the system 10 includes a configurable flowmeter 12, which is mounted to a pipe, duct or other form of conduit (hereinafter "pipe") 14 having a single or multi-phase fluid 13 passing therethrough. The flowmeter 12 includes a sensor head (sensor array) 11 and a transmitter (signal processor) 19. The sensor head 11 includes an array of sensors 15, 16, 17, and 18 spaced axially along the pipe 14 to measure unsteady pressures created by sound propagating through the fluid 13 and/or unsteady pressures created by vortical disturbances (eddies) propagating within the fluid 13. The pressure signals $P_1(t), P_2(t), P_3(t), P_4(t)$ provided by each respective sensor 15, 16, 17, 18 are indicative of unsteady pressure within the pipe 14 at a corresponding axial location of the pipe 14. While the flowmeter 12 is shown as including four pressure sensors, it is contemplated that the flowmeter 12 may include an array of two or more pressure sensors, each providing a pressure signal P(t) indicative of unsteady pressure within the pipe 14 at a corresponding axial location of the pipe 14.

The pressure signals $P_1(t), P_2(t), P_3(t), P_4(t)$ provided by each respective sensor 15, 16, 17, 18 are processed by a transmitter 19, which applies this data to flow logic 36 executed by transmitter 19 to determine one or more parameters 21 of the flow process, such as volumetric flow rate, mass flow rate, density, composition, entrained air, consistency, particle size, velocity, mach number, speed of sound propagating through the fluid 13, and/or other parameters of the fluid 13. The flow logic 36 is described in further detail hereinafter.

The transmitter 19 may also apply one or more of the pressure signals $P_1(t), P_2(t), P_3(t), P_4(t)$ and/or one or more parameters 21 from the flow logic 36 to diagnostic logic 38. Diagnostic logic 38 is executed by transmitter 19 to diagnose the health of any device 34 in the process flow that causes unsteady pressures to be generated in the section of the pipe 14 where flowmeter 12 is disposed. In FIG. 1, device 34 is depicted as a valve; however, it is contemplated that device 34 may be any machinery, component, or equipment, e.g., motor, fan, pump, generator, engine, gearbox, belt, drive, pulley, hanger, clamp, actuator, valve, meter, or the like. The transmitter 19 may output one or more parameters 21 indicative of the health of the diagnosed device 34. The diagnostic logic 38 is described in further detail hereinafter.

The flowmeter 12 may have a design comprising or similar to one or more of the flowmeters described in U.S patent application, Ser. No. 10/875,856, filed concurrently herewith, which is incorporated by reference herein in its entirety.

In the present invention, the flowmeter 12 is configurable to process the pressure signals $P_1(t), P_2(t), P_3(t), P_4(t)$ to provide any desired parameter 21 or combination of parameters 21 in response to a data selection signal 20 generated by one of a local communication device 26 and a remote communication device 28. Specifically, one or more of the output parameters 21 of the configurable flowmeter 12 is selectably provided to a local communication device 26 and/or a remote communication device 28, in response to a data selection signal 24. The data selection signal 24 is provided by one or both of the communication devices 26, 28. In response to the data selection signal 24, a controller/transceiver 22 (signal processor) generates a control signal 20. In response to the control signal 20, the transmitter 19 processes the pressure signals $P_1(t)$, $P_2(t)$, $P_3(t)$, $P_4(t)$ to provide the one or more selected parameters 21 to the controller/transceiver 22. The one or more selected parameters 21 are, in turn, provided to at least one of the communication devices 26, 28 as data 30.

It is contemplated that the flowmeter 12 has only a single function or a fixed set of functions that may be enabled or disabled in response to the control signal 20 or is otherwise enabled and disabled in response to the control signal 20. In this manner, the flowmeter 12 itself can be considered latent and selectable. That is, the flowmeter 12 is either "on" (providing parameters 12 indicating the single or fixed set of functions) or "off" (providing no parameters 12).

Alternatively, the transmitter 19 may provide all possible parameters 21 to the controller/transceiver 22 (irrespective of the control signal 20), and the controller/transceiver 22, in response to the data selection signal 24, provides the selected parameters 21 to the desired communication device 26, 28.

The controller/transceiver 22 may include billing logic 45, which provides a bill or other accounting data to an end user at the local or remote communication devices 26, 28, depending on whether the flowmeter 12 is selected (i.e., turned on) and depending on the parameters 21 parameters that the end user selects. The billing logic 45 is described in further detail hereinafter.

The system 10 may function as an "open loop" system, wherein the selected parameters 21 are provided as data 30 to the desired communication device 26, 28 to allow operating personnel to monitor and record the selected parameters 21. The system 10 may also function as a "closed loop" system, wherein, in addition to allowing operating personnel the ability to monitor the selected parameters 21, the controller/transceiver 22 provides control signals 39 to control one or more devices 34 in the flow process. The one or more controlled devices 34 may or may not be a device 34 diagnosed by the diagnostic logic 38.

Where system 10 functions as a closed loop system, the controller/transceiver 22 may apply one or more of the parameters 21 to control logic 41 executed by the controller/transceiver 22. The control logic 41 may, for example, compare one or more parameters 21 to stored threshold values, set points, or user input parameters to determine an appropriate control signal 39 for causing the appropriate operating condition of the one or more devices 34. For example, if fluid 13 flow is determined to be below a stored threshold value, control logic 41 may provide control signals 34 to valves and/or pumps in the flow process. In another example, if one or more parameters 21 indicates that a device 34 is malfunctioning, as may be determined by the diagnostic logic 38, then the control logic 41 may provide a control signal 39 effective to stop operation of the device 34.

Referring to FIGS. 2a-d, the data selection signal 24 may be a bit or group of bits that indicate to the controller/transceiver 22 which of the parameters 21 to provide to the communication devices 26, 28. For example, the bit pattern of FIG. 2a may indicate that parameters 21 indicative of volumetric flow measurement, entrained air measurement, and gas volume fraction measurement are to be provided. The bit pattern of FIG. 2b may indicate that no measurements are to be provided, or that a parameter 21 indicative of a health of a diagnosed device 34 is to be provided. The bit pattern of FIG. 2c may indicate that all available parameters 21 are to be provided. The bit pattern of FIG. 2d may indicate that only a parameter 21 indicative of volumetric flow in the pipe 14 is to be provided.

Referring again to FIG. 1, the transmitter 19 and the controller/transceiver 22 may be any one or more signal processing devices for executing programmed instructions, such as one or more microprocessors or application specific integrated circuits (ASICs), and may include memory for storing programmed instructions, set points, parameters, and for buffering or otherwise storing data. For example, the transmitter 19 and the controller/transceiver may each be a general-purpose computer.

One skilled in the art will appreciate that the transmitter 19 and the controller/transceiver 22 may be separate devices that are located remotely from each other. For example, the transmitter 19 may be located proximate the sensor head 11 within an industrial plant, and the controller/transceiver 22 may be separately located in an electronics room or control room within the industrial plant. It is also contemplated that the transmitter 19 and the controller/transceiver 22 may be integrated into a single device, such as that indicated at 43 in FIG. 6, which is described in further detail hereinafter.

The local communication device 26 may communicate with the controller/transceiver 22 by wired or wireless connection or any combination of the two, and may be connected via a Local Area Network (LAN).

The remote communication device 28 may communicate with the controller/transceiver 22 by wired or wireless connection or any combination of the two, and may be connected by one or more network or dedicated transmission links of any size (e.g. LAN, Wide Area Network, Internet, phone line, satellite link, etc.).

It is contemplated that the flowmeter 12 may include the capability of providing the data 30 as a series (multiplexed) of signals or as parallel signals. It is also contemplated that the flowmeter 12 may include the capability of communicating using various protocols and systems currently in use in the industrial sensing area. For example, the flowmeter 12 may provide conventional 4-20 mA output signals formatted to the open protocol HART® (Highway Addressable Remote Transducer) digital communications format. Similarly, communication from the flowmeter 12 may be performed with an open and interoperable protocol, such as FOUNDATION™ Fieldbus that provides a digital communication link among intelligent field level and control devices via electrical lines. In other examples, the flowmeter 12 may be configured for use with other process protocols, including Device Bus, Sensor Bus, Profibus, Ethernet, TCP/IP, Blue Tooth, IEEE 102.11 b/c/g and others.

Figure 3:
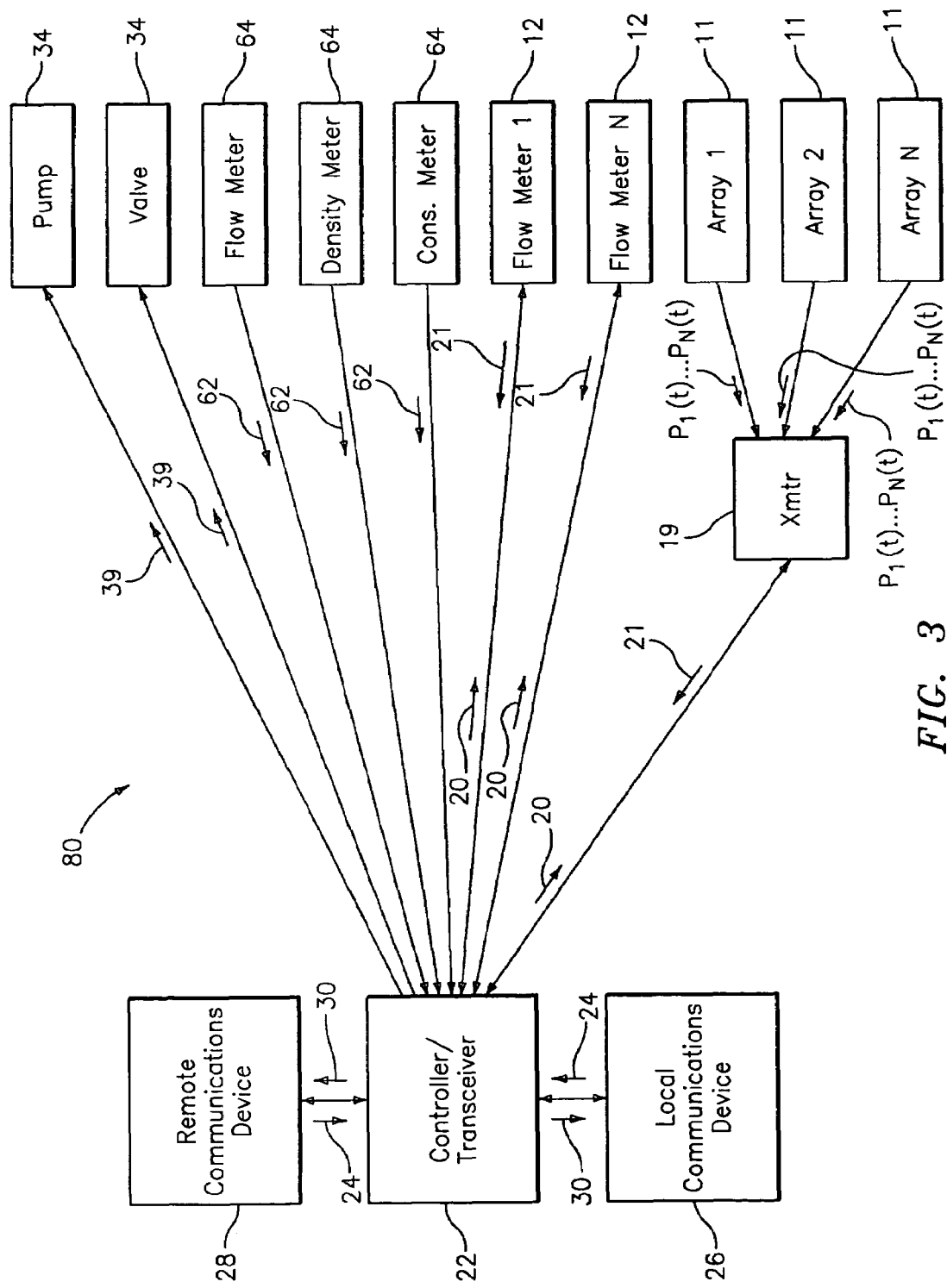
FIG. 3 is a schematic diagram of a system including a plurality of distributed selectable latent configurable flowmeters of FIG. 1.

Referring now to FIG. 3, it is further contemplated that the controller/transceiver 22 may be used in a larger system 60, such as a distributed control system (DCS), to monitor a plurality of flowmeters 12 and, optionally, to control a plurality of devices 34 in response to the parameters 21 received from the plurality of flowmeters 12. The controller/transceiver 22 may also monitor a plurality of standard meters 62, which may include consistency meters, density meters, standard flowmeters, pressure sensors, temperature sensors, and the like, and may control the plurality of devices 39 in response to signals received from these standard meters 62. Also, as shown in FIG. 3, the unsteady pressure signals $P_1(t)$, $P_2(t)$, $P_3(t)$, $P_4(t)$ from a group of sensor heads (arrays) 11 may be provided to a single transmitter 19.

In system 60, the measured parameters 21 of the transmitter 19 servicing the group of sensor heads 11, as well as the measured parameters 21 from the flowmeters 12 (which also include transmitters 19 as shown in FIG. 1), are provided to the controller/transceiver 22, which controls the selection of the measured parameters 21 similar to that described hereinbefore. The one or more selected parameters 21 are provided to at least one of the communication devices 26, 28 as data 30, and may be applied by the controller/transceiver 22 to provide a control signal 39 to the devices 34.

In the embodiment shown, the flowmeters 12, transmitter 19, standard meters 64, and devices 34 separately communicate with the controller/transceiver 22; however, it is contemplated that all or a portion of the flowmeters 12, transmitter 19, standard meters 64, and devices 34 may be connected to a common cable, with the signals from the connected meters, transmitters, and devices being multiplexed on the common cable using any known multiplexing technique. This multiplexed arrangement is similar to that found in the PlantWeb® architecture manufactured by Emerson Corporation.

As previously described with respect to system 10 of FIG. 1, the system 60 of FIG. 3 enables a user either locally or remotely to select any one or more of the flowmeters 12 and/or one or more transmitters 19 distributed throughout a flow process, and to further select a parameter 21 to be provided by any of the flowmeters 12 and transmitters 19. This capability permits a user to disable particular meters or functions of a meter to provide latent meters and functions that may be accessed in accordance with a desired schedule or circumstance. Also, as described hereinbefore, the controller/transceiver 22 may include billing logic 45 (FIG. 1) which provides a bill or other accounting data to an end user at the local or remote communication devices 26, 28, depending on the flowmeters 12 selected and depending on the parameters 21 the end user selects. The billing logic 45 is described in further detail hereinafter.

Figure 4:
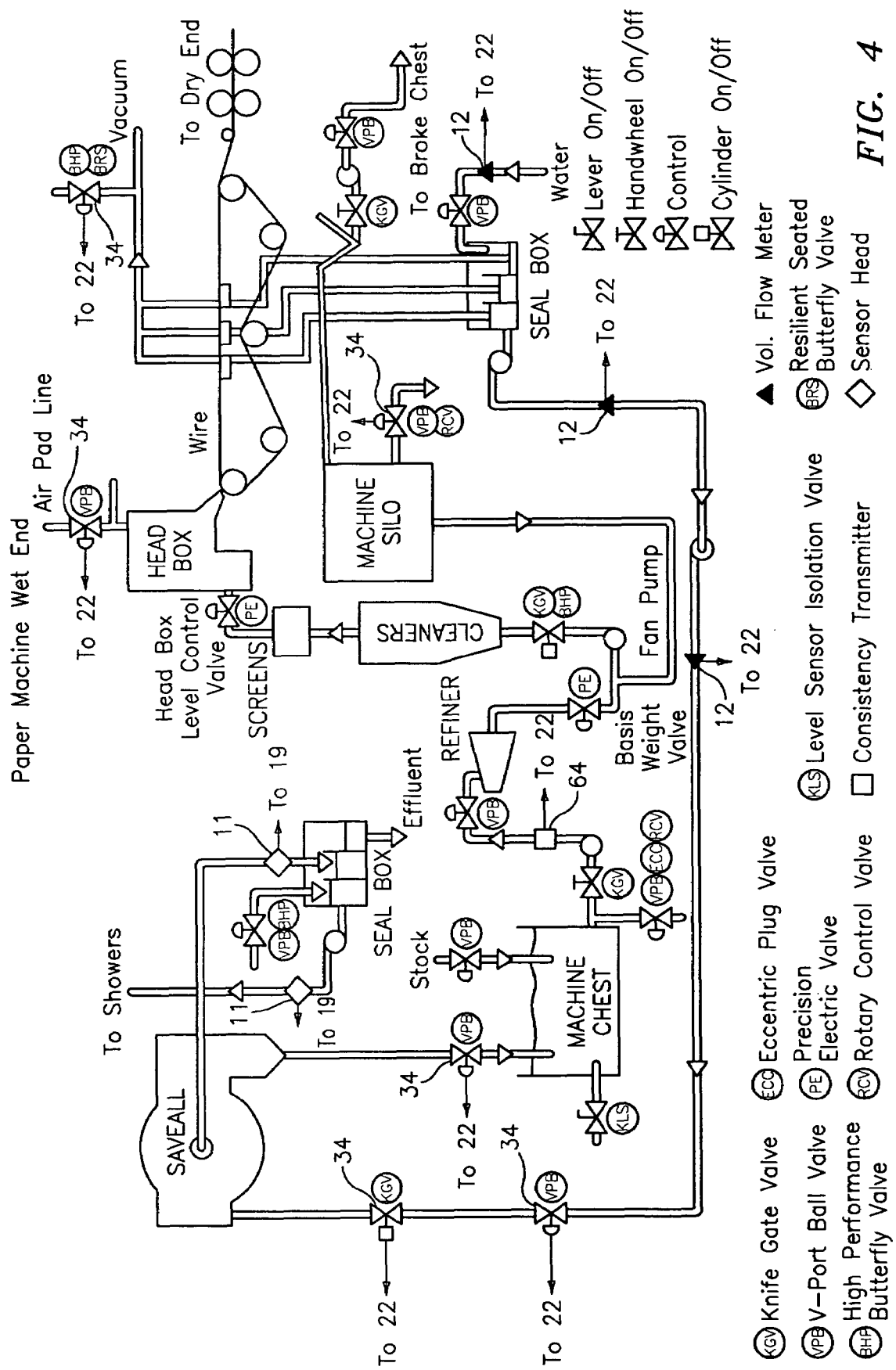
FIG. 4 is a schematic diagram of the system of FIG. 3 integrated into a representative process plant.

FIG. 4 shows the system 60 integrated in a pulp and paper application. Specifically, FIG. 4 illustrates a schematic diagram of a paper machine wet end including a plurality of flowmeters 12, sensor heads 11, standard meters 64, and devices 34 as part of the system 60.

Figures 2A, 2B, 2C, 2D, 5:
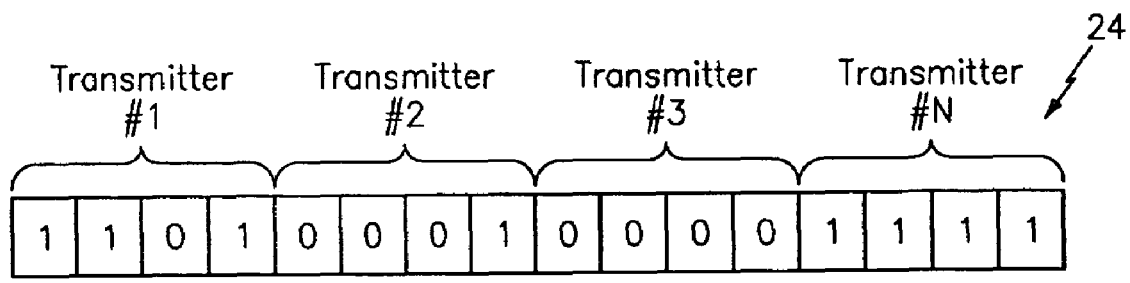
FIG. 2a-d are diagrams of a digital data selection signal for use in selecting a function in the configurable flowmeter of FIG. 1 or for selecting the meter itself.
FIG. 5 is a diagram of a digital data selection signal for use in selecting at least one flowmeter and a function in at least one flowmeter in the system of FIG. 3.

Referring to FIG. 5, the data selection signal 24 for use in the system 60 may be a word or group of words that indicate to the controller 22 which of the measured parameters 21 to provide to the communication devices 26, 28 for each transmitter 19. It will be appreciated that in the system 60, each transmitter 19 may be associated with a flowmeter 12 or with a plurality of arrays 11. In the data selection signal 24 of FIG. 5, the first four bits may be associated with a first transmitter 19, and the bit pattern of the first four bits may indicate that volumetric flow measurement, particle size measurement, and gas volume fraction measurement parameters 21 are to be provided. The next 4 bits may be associated with a second transmitter 19, and the bit pattern of the second four bits may indicate that a volumetric flow rate measurement parameter 21 is to be provided. The next four bits may be associated with a third transmitter 19, and the bit pattern of the next four bits may indicate that no measurements are to be provided, or that a parameter 21 indicative of a health of a diagnosed device 34 is to be provided. The final four bits may be associated with a fourth transmitter 19, and the bit pattern provided by the final four bits may indicate that all available parameters 21 are to be provided. It will be appreciated that any known protocol may be used for data selection signal 24.

Figure 6:
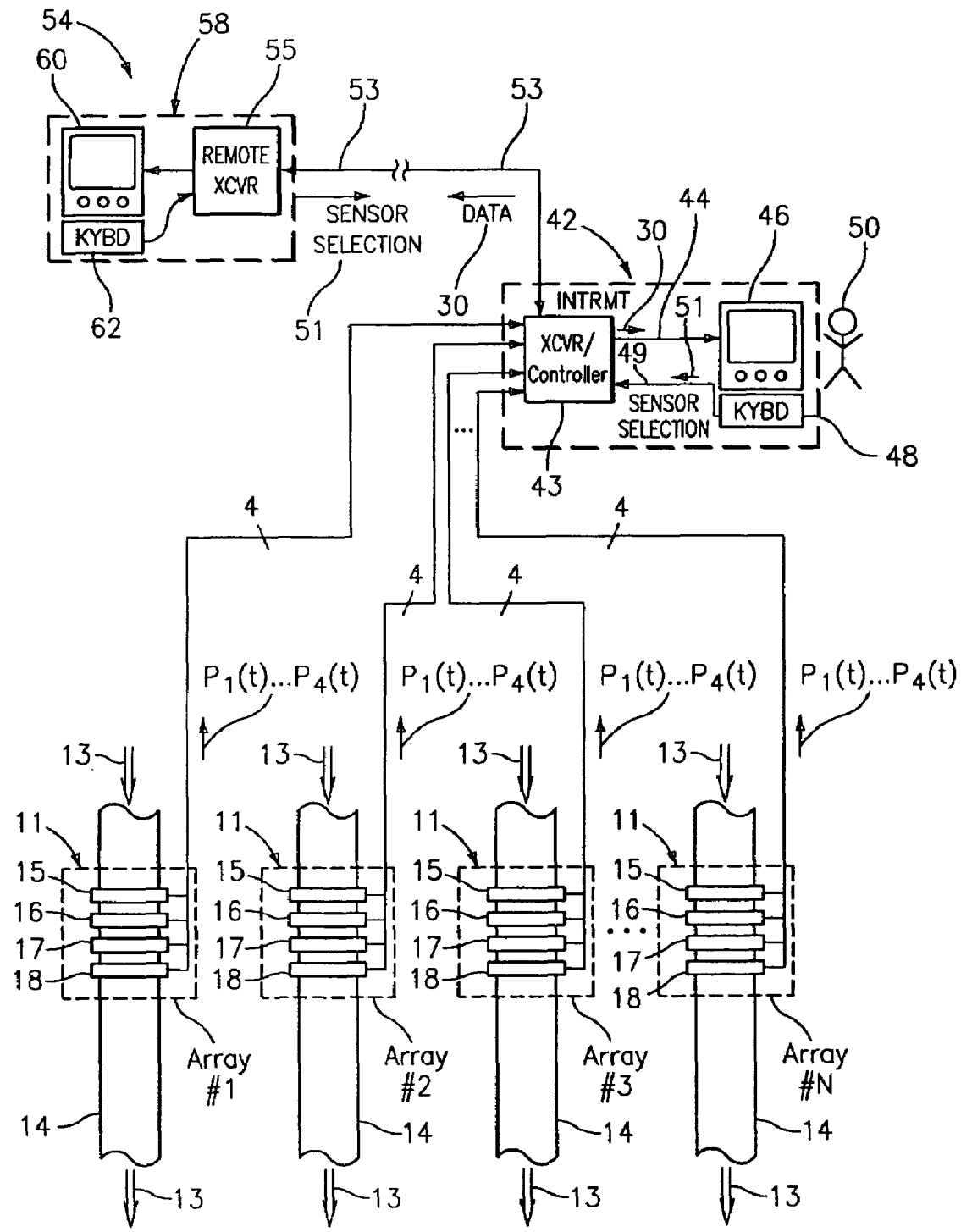
FIG. 6 is a schematic diagram of a flow process fitted with a system of distributed selectable latent flowmeters, in accordance with an alternative embodiment of the present invention.
Figure 7:
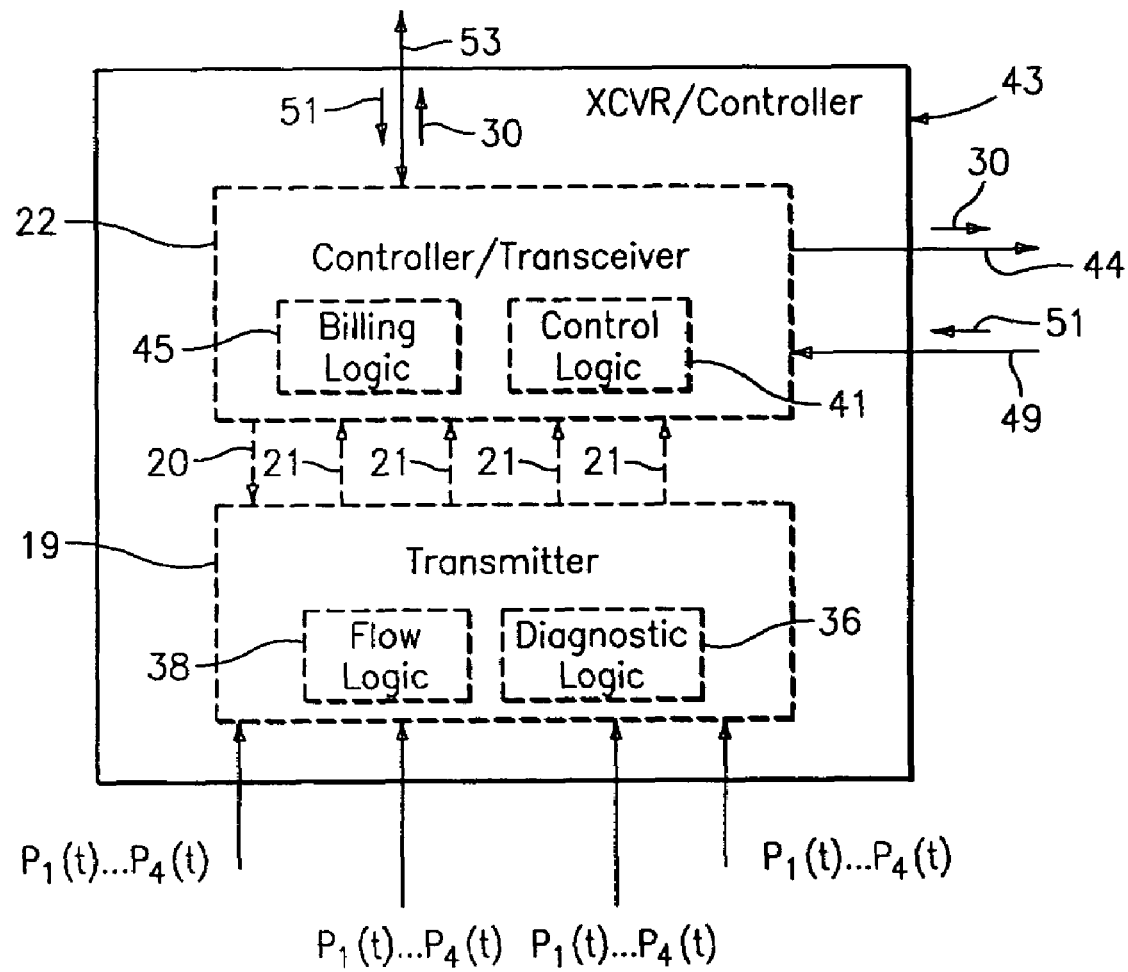
FIG. 7 is a schematic diagram of a transceiver/controller for use with the system of FIG. 6.

Referring now to FIG. 6, a system 40 is shown, wherein pressure signals $P_1(t)$, $P_2(t)$, $P_3(t)$, $P_4(t)$ provided by one or more sensor heads 11 distributed throughout a flow process are processed by a transceiver/controller (signal processor) 43 to determine output data 30 indicative of one or more parameters of the flow process. As depicted in FIG. 7, the functionality of the transmitter 19 and the controller/transceiver 22 previously described with respect to FIGS. 1-5 are integrated into the transceiver/controller 43. As also previously described, the parameters 21 of the flow process may include volumetric flow rate, mass flow rate, density, composition, entrained air, consistency, particle size, velocity, mach number, speed of sound propagating through the fluid 13, and/or other parameters of the fluid 13. The parameters 21 may also indicate the health of a diagnosed device in the flow process.

The transceiver/controller 43 may be only one or more signal processing devices for executing programmed instructions, such as one or more microprocessors or application specific integrated circuits (ASICS), and may include memory for storing programmed instructions, set points, parameters, and for buffering or otherwise storing data.

Referring to FIGS. 6 and 7, the output data 30 on line 44 is provided to a display 46 or other visual, electronic, or printing device for communicating the various parameters 21 to an end user 50. Also, the transceiver/controller 43 may be connected by a line 49 to a data entry device 48, such as a keyboard and/or mouse. The transceiver/controller 43, display 46 and data entry device 48 may be provided in a common device 42, such as a personal computer or the like.

In the present embodiment, a sensor selection (on/off) signal 51 is provided to the transceiver/controller 43 and indicates to the transceiver/controller 43 which of the sensor heads 11 to use in generating the parameters 21 provided as output data 30 to the end user 50. The sensor selection signal 51 may be provided from the keyboard 48 or from a remote link 53 (discussed hereinafter), or on a separate line (not shown), or by other means.

The transceiver/controller 43 may operate in many different ways to provide the selected output data 30 in response to the sensor selection signal 51. For example, the transceiver/controller 43 may process pressure signals $P_1(t)$, $P_2(t)$, $P_3(t)$, $P_4(t)$ from each of the sensor heads 11 and provide output data 30 corresponding only to the selected sensor heads 11. Alternatively, the transceiver/controller 43 may only process pressure signals $P_1(t)$, $P_2(t)$, $P_3(t)$, $P_4(t)$ from the selected sensor heads 11 and provide output data 30 corresponding to those sensor heads 11.

In addition to or instead of sending the output data 30 to the display 46, the remote link 53 may be used to communicate the sensor selection signal 51 and output data 30 between the device 42 and a remote location 54. The remote location 54 may have a remote device 58 (e.g., a personal computer or the like) connected to the remote link 53. The remote device 58 may comprise a remote transceiver 55, a remote display 60 similar to the display 46, and a data entry device 62, such as a keyboard and/or mouse. The remote transceiver 55 may be similar to the transceiver/controller 43 if the same functions are performed, or may comprise different hardware and/or software if additional or different functions are performed as described herein.

The remote device 58 may retrieve or receive output data 30 or other signals from the device 42 and/or send the sensor selection signal 51 to the device 42 to activate or inactivate certain of the sensor heads 11. The remote device 58 may perform the same functions as the device 42 and/or may do other processing on the measured data as desired and/or may process billing information, or perform other functions. Also, the remote device 58 may perform the billing and/or receive the payments electronically, such as by wire transfer or other electronic commerce or banking technique.

The remote link 53 may be partially or completely wired or wireless, and may comprise an internet link. The remote link 53 may be used to communicate output data 30 and/or to send the sensor selection signal 51 to activate or inactivate certain of the sensor heads 11 or data therefrom between the remote location 54 and the device 42.

It is contemplated that the transceiver/controller 43 may process pressure signals $P_1(t)$, $P_2(t)$, $P_3(t)$, $P_4(t)$ from each of the sensor heads 11 and provide all available output data 30 for each of the sensor heads 11 to the remote device 58. In this embodiment, the remote device 58 may, in turn, provide output data 30 to the remote display 60 for only those sensor heads 11 indicated in the sensor selection signal 51. Also in this embodiment, the device 42 may send the sensor selection signal 51 to the remote device 68 for processing the data remotely.

Figures 8, 9:
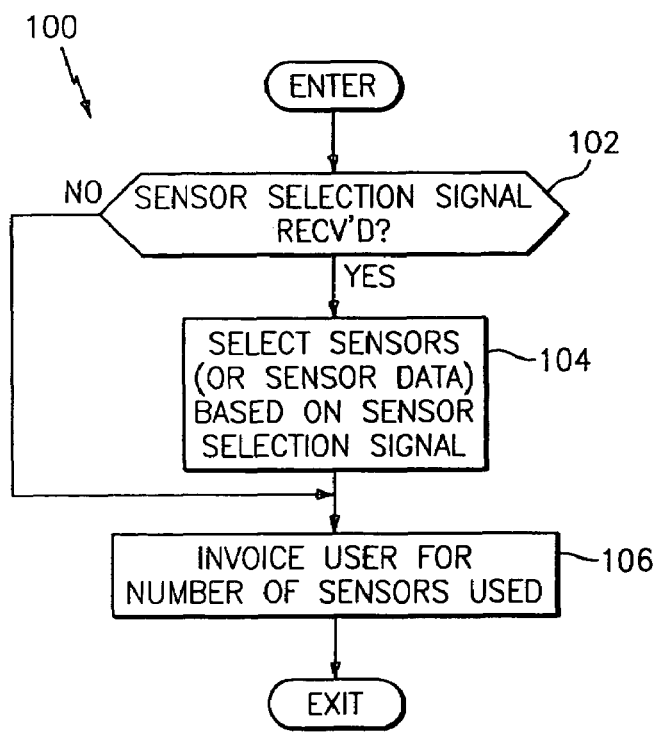
FIG. 8 is a diagram of a sensor selection signal for use with the system of FIG. 6.
FIG. 9 is a flow diagram of a flowmeter selection and billing arrangement that may be used with the configurable flowmeters of the present invention.

Referring to FIG. 8, the sensor selection signal 51 may be a digital word or group of words that indicate to the device 42 which of the sensor heads 11 will be used in generating the parameters 21 provided as output data 30. For example, FIG. 7 shows a sensor selection signal 51, where each bit in a 16 bit word represents the status (on/off) of data coming from a corresponding one of the sensor heads 11.

Alternatively, the sensor selection signal 51 may be a code related to an end user, which pre-selects certain of the sensor heads 11. For example, the user may enter a user code into the device 42 and, based on the user code, the device 42 selects predetermined ones of the sensor heads 11. This code, for example, may be based on the location of the sensor head 11 or the parameters 21 desired by the user. Alternatively, the user may enter a user code and the user code is transmitted over the remote link 53 to the remote device 58 which selects the appropriate sensor selection signal 51 for that user and transmits the sensor selection signal over the remote link 53 to the device 42 for selection of the appropriate sensor heads 11 for that user. Alternatively, there may be a predetermined profile or schedule indicating which sensor heads 11 to select based on age of the equipment, elapsed time, user code, or other parameters, such selection may be periodic or cyclical, such as always selecting certain sensor heads 11 at certain times, and selecting certain other sensor heads 11 at certain other times in a repetitive or random pattern, thereby providing automatic reconfiguration of the selected sensor heads 11 without the need for user intervention.

The pressure sensors 15-18 described herein may be any type of pressure sensor, capable of measuring the unsteady (or ac or dynamic) pressures within a pipe 14, such as piezoelectric, optical, capacitive, resistive (e.g., Wheatstone bridge), accelerometers (or geophones), velocity measuring devices, displacement measuring devices, etc. If optical pressure sensors are used, the sensors 15-18 may be Bragg grating based pressure sensors, such as that described in U.S. patent application, Ser. No. 08/925,598, entitled "High Sensitivity Fiber Optic Pressure Sensor For Use In Harsh Environments", filed Sep. 8, 1997, now U.S. Pat. No. 6,016,702, and in U.S. patent application, Ser. No. 10/224,821, entitled "Non-Intrusive Fiber Optic Pressure Sensor for Measuring Unsteady Pressures within a Pipe", which are incorporated herein by reference. Alternatively, the sensors 15-18 may be electrical or optical strain gages attached to or embedded in the outer or inner wall of the pipe which measure pipe wall strain, including microphones, hydrophones, or any other sensor capable of measuring the unsteady pressures within the pipe 14. In an embodiment of the present invention that utilizes fiber optics as the pressure sensors 15-18, they may be connected individually or may be multiplexed along one or more optical fibers using wavelength division multiplexing (WDM), time division multiplexing (TDM), or any other optical multiplexing techniques.

For any of the embodiments described herein, the pressure sensors 15-18, may be attached to the pipe by adhesive, glue, epoxy, tape or other suitable attachment means to ensure suitable contact between the sensor and the pipe 14. The pressure sensors 15-18 may alternatively be removable or permanently attached via known mechanical techniques such as mechanical fastener, spring loaded, clamped, clam shell arrangement, strapping or other equivalents. Alternatively, the pressure sensors 15-18 may be embedded in the pipe 14. The pressure sensors 15-18 may be selected from piezoelectric, piezoresistive, strain gauge, PVDF, optical sensors, ported ac pressure sensors, accelerometers, velocity sensors, and displacement sensors.

It is also within the scope of the present invention that any other strain sensing technique may be used to measure the variations in strain in the pipe 14, such as highly sensitive piezoelectric, electronic or electric, strain gages attached to or embedded in the pipe 14.

In certain embodiments of the present invention, a piezoelectronic pressure transducer may be used as one or more of the pressure sensors 15-18 and it may measure the unsteady (or dynamic or ac) pressure variations inside the pipe 14 by measuring the pressure levels inside of the pipe. In one embodiment of the present invention, the pressure sensors 15-18 comprise pressure sensors manufactured by PCB Piezotronics of Depew, N.Y. In one pressure sensor there are integrated circuit piezoelectric voltage mode-type sensors that feature built-in microelectronic amplifiers, and convert the high-impedance charge into a low-impedance voltage output. Specifically, a Model 106 B manufactured by PCB Piezotronics is used which is a high sensitivity, acceleration compensated integrated circuit piezoelectric quartz pressure sensor suitable for measuring low pressure acoustic phenomena in hydraulic and pneumatic systems. It has the unique capability to measure small pressure changes of less than 0.001 psi under high static conditions. The 106 B has a 300 mV/psi sensitivity and a resolution of 91 dB (0.0001 psi).

The pressure sensors 15-18 may incorporate a built-in MOSFET microelectronic amplifier to convert the high-impedance charge output into a low-impedance voltage signal. In this embodiment, the pressure sensors 15-18 are powered from a constant-current source and can operate over long coaxial or ribbon cable without signal degradation. Power to operate integrated circuit piezoelectric sensors generally takes the form of a low-cost, 24 to 27 VDC, 2 to 20 mA constant-current supply. The system 10 of the present invention may incorporate constant-current power for directly powering integrated circuit piezoelectric pressure sensors 15-18.

Furthermore the present invention contemplates that each of the pressure sensors 15-18 may include a piezoelectric material to measure the unsteady pressures of the fluid 13. The piezoelectric material, such as the polymer, polarized fluoropolymer, polyvinylidene fluoride (PVDF), measures the strain induced within the process pipe 14 due to unsteady pressure variations within fluid 13. Strain within the pipe 14 is transduced to an output voltage or current by the attached piezoelectric pressure sensors 15-18.

Preferably, the PVDF material forming each of the pressure sensors 15-18 is adhered to the outer surface of a steel strap that extends around and clamps onto the outer surface of the pipe 14. The piezoelectric pressure sensors 15-18 are typically conformal to allow complete or nearly complete circumferential measurement of induced strain. The pressure sensors 15-18 can be formed from PVDF films, co-polymer films, or flexible PZT sensors, similar to that described in "Piezo Film Sensors technical Manual" provided by Measurement Specialties, Inc. of Fairfield, N.J., which is incorporated herein by reference. The advantages of this technique are the following:

1. Non-intrusive flow rate measurements
2. Low cost
3. Measurement technique requires no excitation source. Ambient flow noise is used as a source.
4. Flexible piezoelectric sensors can be mounted in a variety of configurations to enhance signal detection schemes. These configurations include a) co-located sensors, b) segmented sensors with opposing polarity configurations, c) wide sensors to enhance acoustic signal detection and minimize vortical noise detection, d) tailored sensor geometries to minimize sensitivity to pipe modes, e) differencing of sensors to eliminate acoustic noise from vortical signals.
5. Higher Temperatures (140 C) (co-polymers)

For the system 60 of FIG. 6, the use of fiber optic based pressure sensors 15-18 in sensor heads 11 makes the system 60 particularly qualified for industrial applications requiring multiple sensor heads 11. The use of multiplexed sensor heads 11 through the use of feedthroughs (or other known techniques) in a large multi-point process enables connectivity to the multiple sensor heads 11 through a single fiber optic cable. As a result, dedicated wiring to the transceiver/controller 43 and back to the sensor to provide a power signal is obviated.

Billing Logic

Referring to FIG. 9, an example of billing logic 45 is shown as may be applied to the embodiment of FIG. 6. In the embodiment of FIG. 9, the end user is only billed for and only pays for the sensor heads 11 that are selected (i.e., the "on" flowmeters) as indicated by a top level flow chart 100. In particular, when a sensor selection signal 51 is received, the appropriate ones of the sensor heads 11 or data therefrom are selected as dictated by the sensor selection signal 51 described hereinbefore, as shown by a step 104. Then, a bill or invoice is sent to the user (or customer) and the user pays only for the number of sensor heads 11 selected to receive data from, as indicated in step 106. The sensor selection signal 51 may also be used to effectively shut off all sensor heads (e.g. prevent transceiver/controller 43 from processing pressure signals $P_1(t)$, $P_2(t)$, $P_3(t)$, $P_4(t)$ or from providing output data 30) if a bill is not paid by the user. The cost to (or payment by) the user may be based on the number of sensor heads 11 selected, the amount of output data 30 provided or the length of time the output data 30 is provided, in a similar manner to that which is done for a utility company, a cable TV company, an internet service provider or the like.

Figure 10:
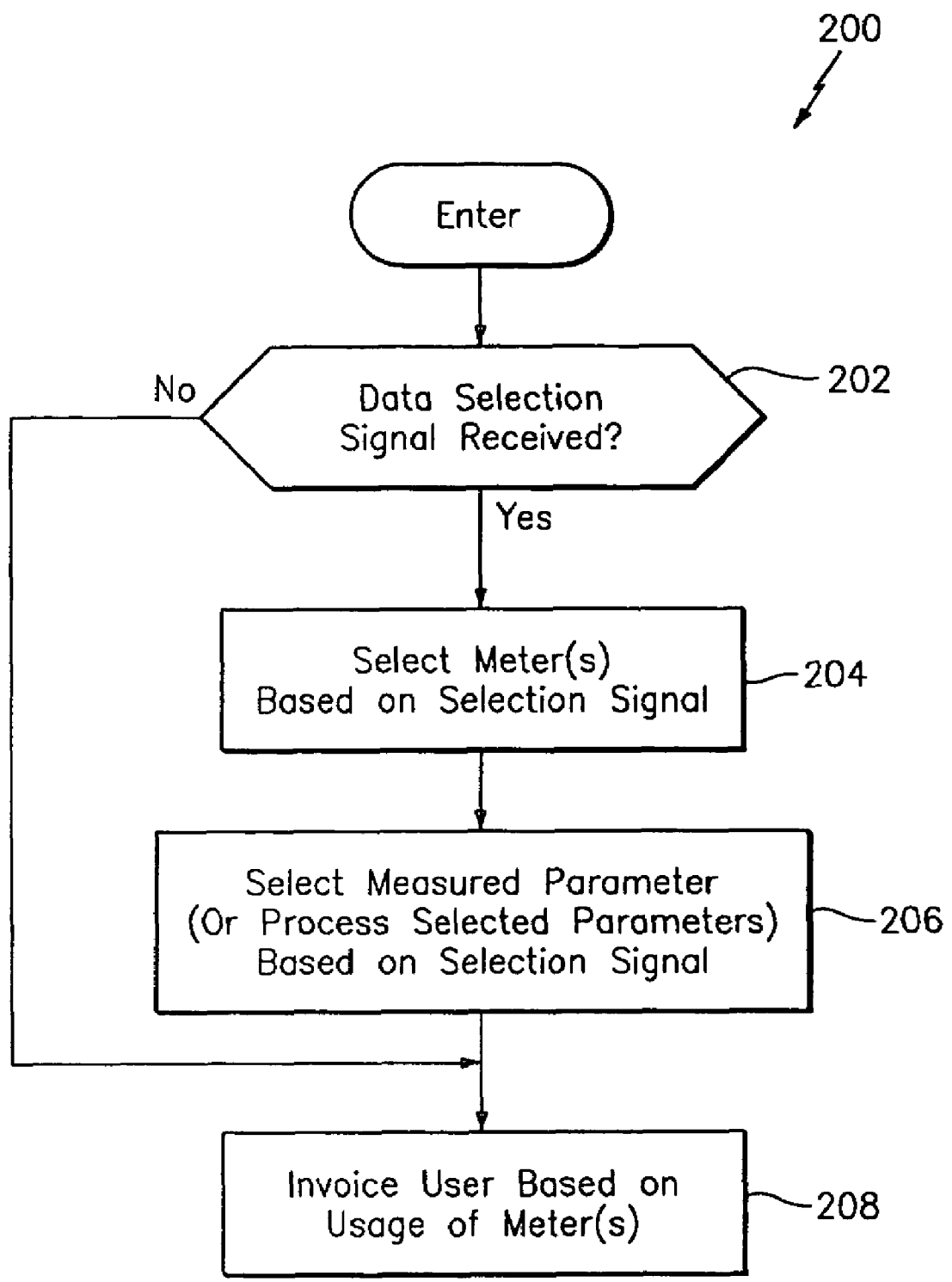
FIG. 10 is a flow diagram of another flowmeter selection and billing arrangement that may be used with the configurable flowmeters of the present invention.

Referring to FIG. 10, an example of billing logic 45 is shown as may be applied to the embodiments of FIGS. 1 and 3. In the embodiment of FIG. 10, the end user 50 is only billed for and only pays for the flowmeters 12 that are selected and the parameters 21 that are selected as indicated in the top level flow chart 200. In particular when a data selection signal 24 is received (see step 202), the appropriate ones of the flowmeters 12 are selected and the parameters 21 of each of the selected flowmeters are selected as dictated by the data selection signal 24 described hereinbefore, as shown by steps 204, 206. Then, a bill or invoice is sent to the user (or customer) and the user pays only for the usage of the flowmeters 12 selected to receive data from, as indicated in step 208. For example, the user can be billed by the number of flowmeters 12 providing data, by the type of parameters 21 being provided by the flowmeters 12, the length of time the flowmeters 12 are providing data, the length of time the user is receiving output data 30, the amount of data provided, the activation of a previously latent flowmeter 12 and/or the number of flowmeters 12 installed in the flow process, in a similar manner to that which is done for a utility company, a cable TV company, an internet service provider or the like. The data selection signal 24 may also be used to effectively shut off all flowmeters 12 (e.g., prevent transmitter 19 from processing pressure signals $P_1(t)$, $P_2(t)$, $P_3(t)$, $P_4(t)$ or prevent controller/transceiver 22 from providing output data 30) if a bill is not paid by the user.

In any of the embodiments described herein the selectability of the flowmeters 12, sensor heads 11, and parameters 21 may be limited to a remote service provided wherein the end user pays for the service or reconfiguring the system and/or pays for the particular usage of the meters as described hereinbefore. The remote user or service provider may also provide a plurality of sensor heads 11 and/or flowmeters 12 to the end user or customer at no cost, but charge the customer for their usage as described hereinbefore.

Also in any of the embodiments described herein, the flowmeters 12 and/or sensor heads 11 may also be used to provide diagnostic functionality. The sensor heads 11 and/or flowmeters 12 may be strategically placed to measure or periodically sample desired flow parameters at particular locations in the process to monitor measurements of other meters or output of particular valves or pumps to determine any drift or degradation of performance. The end-user may pay on a yearly basis for periodic diagnostics performed or pay each time diagnostics is performed. The present invention is flexible to permit the diagnostics to be at specific areas or locations of the plant, and thus enabling diagnostics being performed at different intervals as other areas.

Diagnostic Logic

Figure 11:
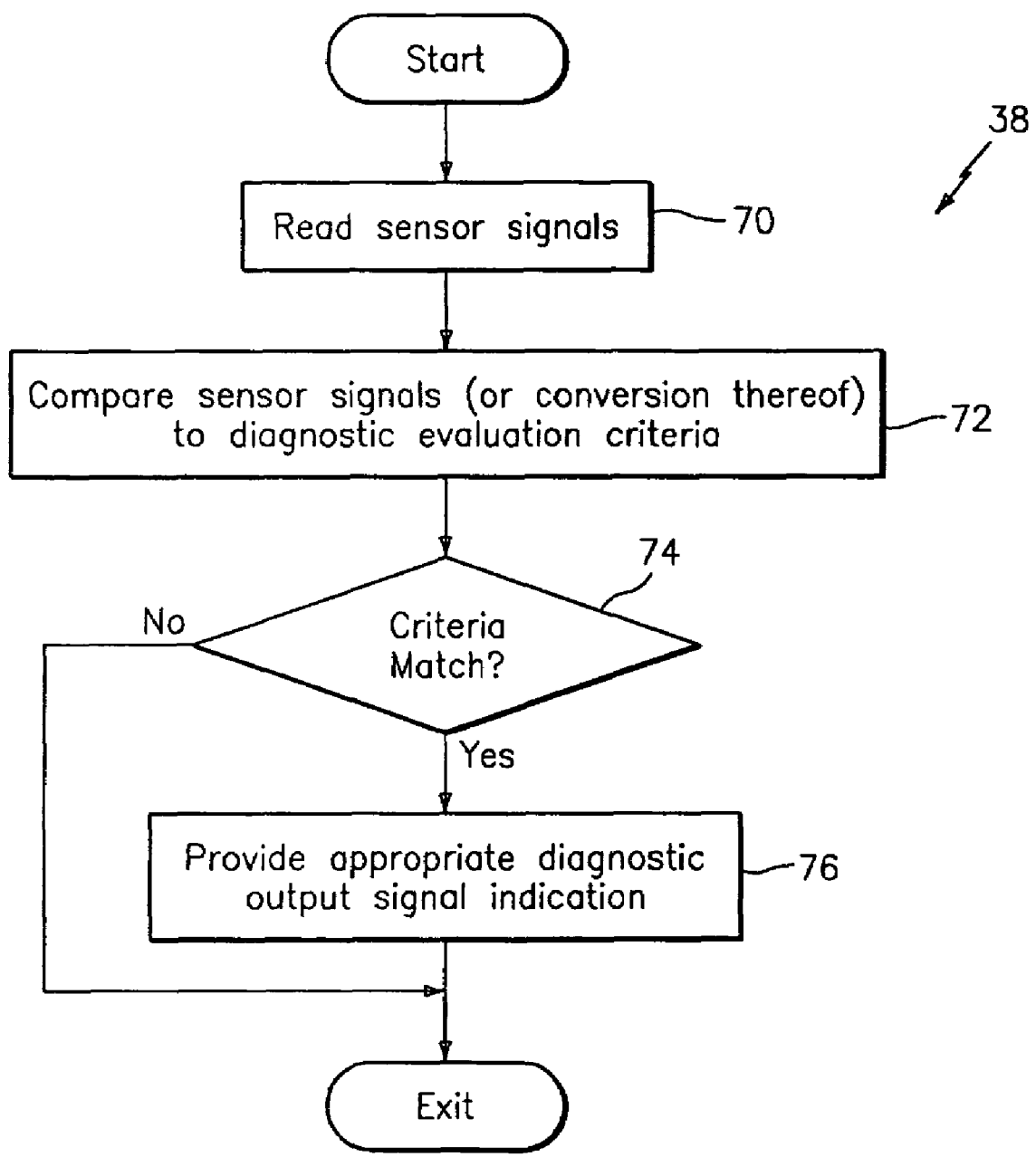
FIG. 11 is a flow chart depicting operation of a diagnostic logic-used in the configurable flowmeter of the present invention.

Referring to FIG. 11, the diagnostic logic 38 measures the sensor input signals (or evaluation input signals), which may include one or more of the pressure signals $P_1(t)$, $P_2(t)$, $P_3(t)$, $P_4(t)$ and the parameters 21, at a step 70. Next, the diagnostic logic 38 compares the evaluation input signals to a diagnostic evaluation criteria at a step 72, discussed hereinafter. Then, a step 74 checks if there is a match, and if so, a step 76 provides a diagnostic signal indicative of the diagnostic condition that has been detected and may also provide information identifying the diagnosed device. The diagnostic signal may be output as a parameter 21.

Where the evaluation input signal is a parameter 21, as may be output from the flow logic 36, the diagnostic evaluation criteria may be based on a threshold value of the flow signal 24. For example, the threshold value may be indicative of a maximum or minimum sound speed, mach number, consistency, composition, entrained air, density, mass flow rate, volumetric flow rate, or the like. If there is not a criteria match in step 74, the diagnostic logic 38 exits.

Where the evaluation input signal includes one or more pressure signals $P_1(t)$, $P_2(t)$, $P_3(t)$, $P_4(t)$, the diagnostic evaluation criteria may be a threshold (maximum or minimum) pressure. Alternatively, the diagnostic evaluation criteria may be based on an acoustic signature, or a convective property (i.e., a property that propagates or convects with the flow). For example, the diagnostic logic 38 may monitor the acoustic signature of any upstream or downstream device (e.g., motor, fan, pump, generator, engine, gear box, belt drive, pulley, hanger, clamp, actuator, valve, meter, or other machinery, equipment or component). Further, the data from the array of sensors 15-18 may be processed in any domain, including the frequency/spatial domain, the temporal/spatial domain, the temporal/wave-number domain, or the wave-number/frequency (k-ω) domain or other domain, or any combination of one or more of the above. As such, any known array processing technique in any of these or other related domains may be used if desired.

For example, for three unsteady pressure signals, the equations in the frequency/spatial domain equation would be: $P(x,\omega)=Ae^{-ik_r x}+Be^{+ik_r x}$; the temporal/spatial domain would be: $P(x,t)=(Ae^{-ik_r x}+Be^{+ik_r x})e^{i\omega t}$; and the k-ω domain (taking the spatial Fourier transform) would be:

$$P(k, \omega) = \frac{1}{2\pi}\int_{-\infty}^{+\infty} P(x, \omega)e^{ikx}dx = A(\omega)\delta\left(k - \frac{\omega}{a}\right) + B(\omega)\delta\left(k + \frac{\omega}{a}\right)$$

where k is the wave number, a is the speed of sound of the material, x is the location along the pipe, ω is frequency (in rad/sec, where ω=2πf), and δ is the Dirac delta function, which shows a spatial/temporal mapping of the acoustic field in the k-ω plane.

Any technique known in the art for using a spatial (or phased) array of sensors to determine the acoustic or convective fields, beam forming, or other signal processing techniques, may be used to provide an input evaluation signal to be compared to the diagnostic evaluation criteria.

Flow Logic

Velocity Processing

Figure 12:
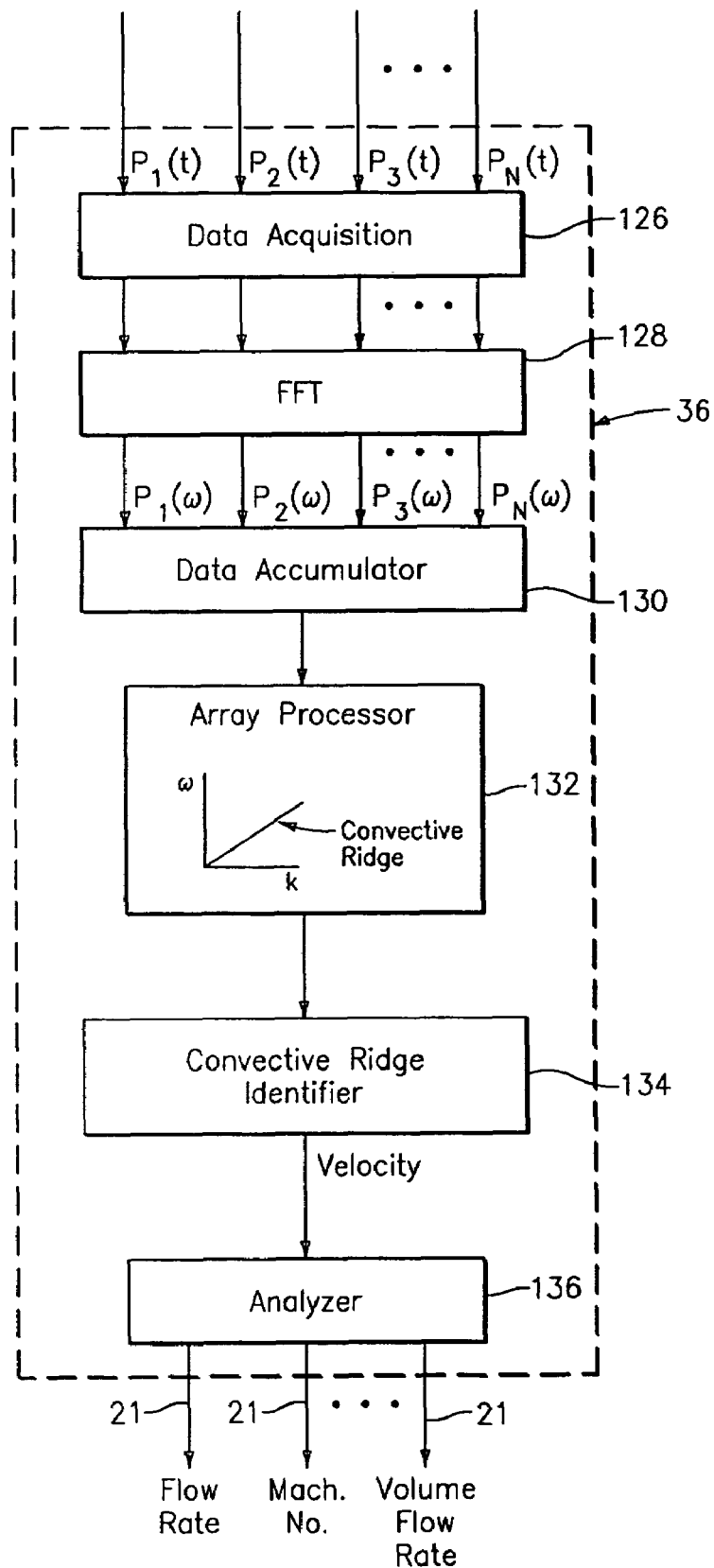
FIG. 12 is a block diagram of a first embodiment of a flow logic used in the apparatus of the present invention.
Figure 13:
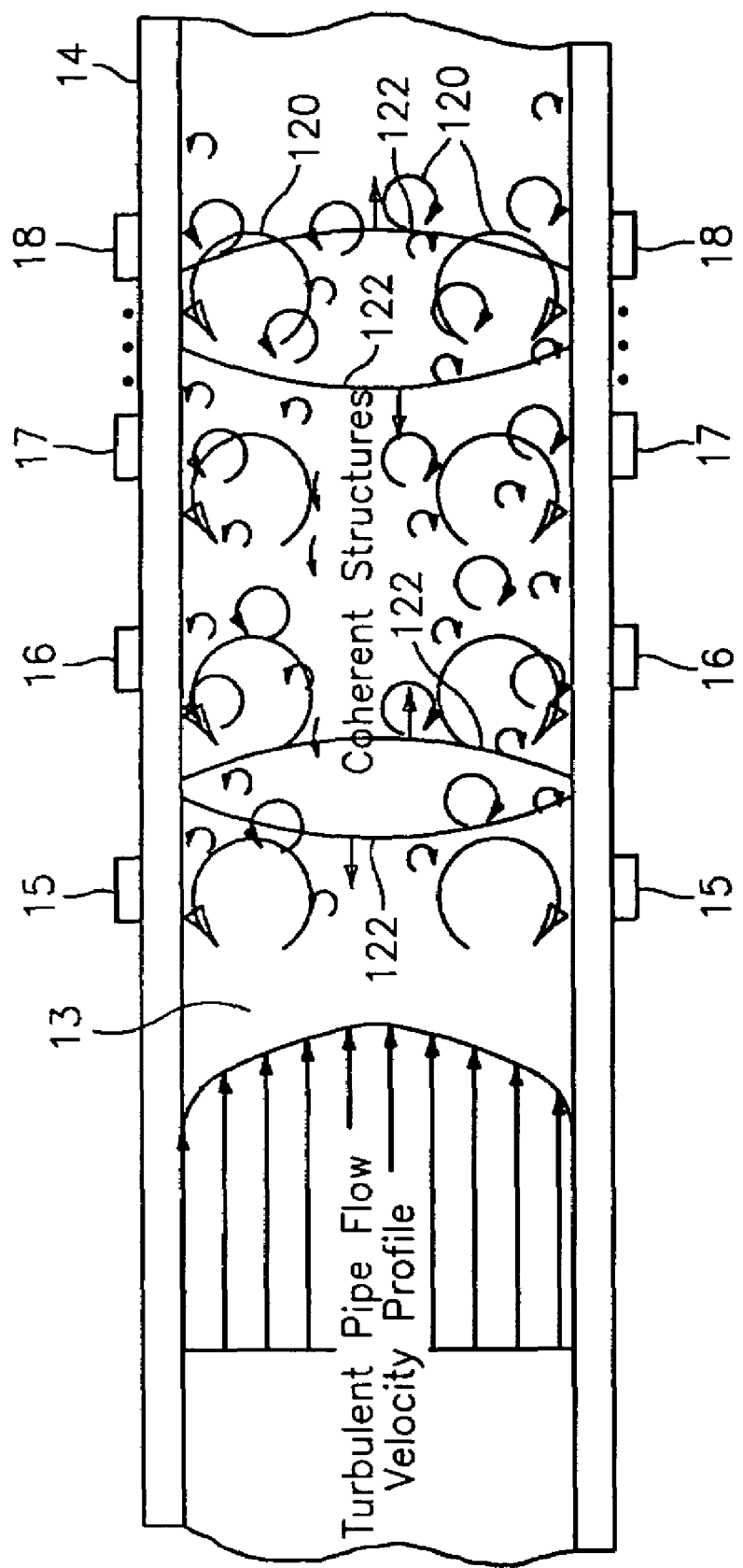
FIG. 13 is a cross-sectional view of a pipe having coherent structures therein.

Referring to FIG. 12, an example of flow logic 36 is shown. As previously described, each array of at least two sensors located at two locations $x_1, x_2$ axially along the pipe 14 sense respective stochastic signals propagating between the sensors within the pipe at their respective locations. Each sensor provides a signal indicating an unsteady pressure at the location of each sensor, at each instant in a series of sampling instants. One will appreciate that each sensor array may include more than two sensors distributed at locations $x_1 \ldots x_N$. The pressure generated by the convective pressure disturbances (e.g., eddies 120, see FIG. 13) may be measured through strained-based sensors and/or pressure sensors. The sensors provide analog pressure time-varying signals $P_1(t), P_2(t), P_3(t), P_N(t)$ to the flow logic 36.

The flow logic 36 processes the signals $P_1(t), P_2(t), P_3(t), P_N(t)$ to first provide output signals (parameters) 21 indicative of the pressure disturbances that convect with the fluid (process flow) 13, and subsequently, provide output signals in response to pressure disturbances generated by convective waves propagating through the fluid 13, such as velocity, Mach number and volumetric flow rate of the process flow 13. The flow logic 36 processes the pressure signals to first provide output signals indicative of the pressure disturbances that convect with the process flow 13, and subsequently, provide output signals in response to pressure disturbances generated by convective waves propagating through the process flow 13, such as velocity, Mach number and volumetric flow rate of the process flow 13.

The flow logic 36 receives the pressure signals from the array of sensors 15-18. A data acquisition unit 126 (e.g., A/D converter) converts the analog signals to respective digital signals. The FFT logic 128 calculates the Fourier transform of the digitized time-based input signals $P_1(t)-P_N(t)$ and provides complex frequency domain (or frequency based) signals $P_1(\omega), P_2(\omega), P_3(\omega), P_N(\omega)$ indicative of the frequency content of the input signals. Instead of FFT's, any other technique for obtaining the frequency domain characteristics of the signals $P_1(t)-P_N(t)$, may be used. For example, the cross-spectral density and the power spectral density may be used to form a frequency domain transfer functions (or frequency response or ratios) discussed hereinafter.

One technique of determining the convection velocity of the turbulent eddies 120 within the process flow 13 is by characterizing a convective ridge of the resulting unsteady pressures using an array of sensors or other beam forming techniques, similar to that described in U.S patent application, Ser. No. 10/007,736 and U.S. patent application, Ser. No. 09/729,994, filed Dec. 4, 200, now U.S. Pat. No. 6,609,069, which are incorporated herein by reference.

A data accumulator 130 accumulates the frequency signals $P_1(\omega) \times P_N(\omega)$ over a sampling interval, and provides the data to an array processor 132, which performs a spatial-temporal (two-dimensional) transform of the sensor data, from the xt domain to the k-ω domain, and then calculates the power in the k-ω plane, as represented by a k-ω plot.

The array processor 132 uses standard so-called beam forming, array processing, or adaptive array-processing algorithms, i.e. algorithms for processing the sensor signals using various delays and weighting to create suitable phase relationships between the signals provided by the different sensors, thereby creating phased antenna array functionality. In other words, the beam forming or array processing algorithms transform the time domain signals from the sensor array into their spatial and temporal frequency components, i.e. into a set of wave numbers given by $k=2\pi/\lambda$ where λ is the wavelength of a spectral component, and corresponding angular frequencies given by $\omega=2\pi\nu$.

The prior art teaches many algorithms of use in spatially and temporally decomposing a signal from a phased array of sensors, and the present invention is not restricted to any particular algorithm. One particular adaptive array processing algorithm is the Capon method/algorithm. While the Capon method is described as one method, the present invention contemplates the use of other adaptive array processing algorithms, such as MUSIC algorithm. The present invention recognizes that such techniques can be used to determine flow rate, i.e. that the signals caused by a stochastic parameter convecting with a flow are time stationary and have a coherence length long enough that it is practical to locate sensor units apart from each other and yet still be within the coherence length.

Convective characteristics or parameters have a dispersion relationship that can be approximated by the straight-line equation, $k=\omega/u$, where u is the convection velocity (flow velocity). A plot of k-ω pairs obtained from a spectral analysis of sensor samples associated with convective parameters portrayed so that the energy of the disturbance spectrally corresponding to pairings that might be described as a substantially straight ridge, a ridge that in turbulent boundary layer theory is called a convective ridge. What is being sensed are not discrete events of turbulent eddies, but rather a continuum of possibly overlapping events forming a temporally stationary, essentially white process over the frequency range of interest. In other words, the convective eddies 120 is distributed over a range of length scales and hence temporal frequencies.

To calculate the power in the kω plane, as represented by a k-ω plot (see FIG. 14) of either the signals, the array processor 132 determines the wavelength and so the (spatial) wavenumber k, and also the (temporal) frequency and so the angular frequency ω, of various of the spectral components of the stochastic parameter. There are numerous algorithms available in the public domain to perform the spatial/temporal decomposition of arrays of sensor units 15-18.

The present invention may use temporal and spatial filtering to precondition the signals to effectively filter out the common mode characteristics $P_{common\ mode}$ and other long wavelength (compared to the sensor spacing) characteristics in the pipe 14 by differencing adjacent sensors and retain a substantial portion of the stochastic parameter associated with the flow field and any other short wavelength (compared to the sensor spacing) low frequency stochastic parameters.

Figure 14:
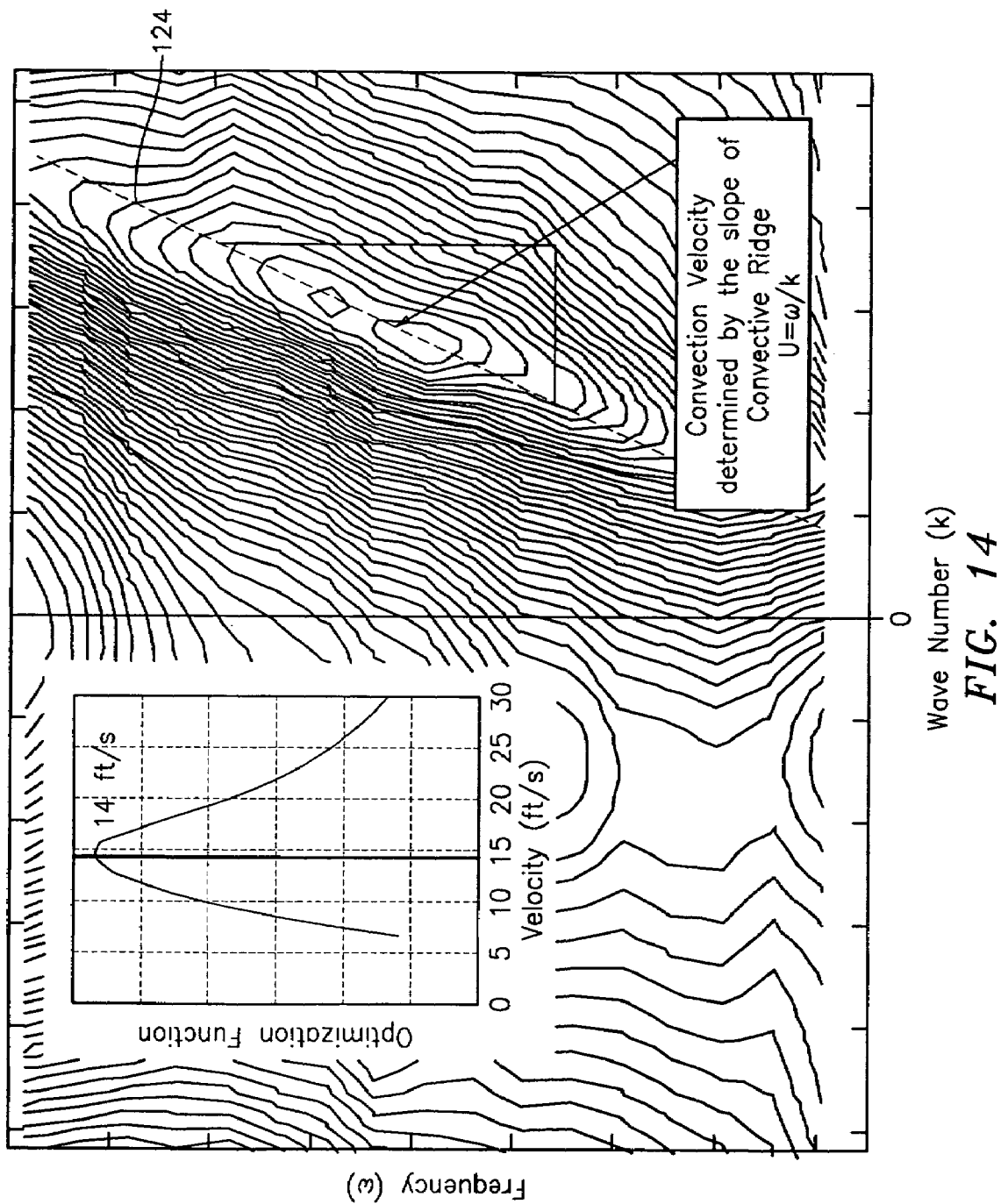
FIG. 14 a kω plot of data processed from an apparatus embodying the present invention that illustrates slope of the convective ridge, and a plot of the optimization function of the convective ridge.

In the case of suitable turbulent eddies 120 (see FIG. 13) being present, the power in the k-ω plane shown in a k-ω plot of FIG. 14 shows a convective ridge 124. The convective ridge represents the concentration of a stochastic parameter that convects with the flow and is a mathematical manifestation of the relationship between the spatial variations and temporal variations described above. Such a plot will indicate a tendency for k-ω pairs to appear more or less along a line 124 with some slope, the slope indicating the flow velocity.

Once the power in the k-ω plane is determined, a convective ridge identifier 134 uses one or another feature extraction method to determine the location and orientation (slope) of any convective ridge 124 present in the kω plane. In one embodiment, a so-called slant stacking method is used, a method in which the accumulated frequency of k-ω pairs in the k-ω plot along different rays emanating from the origin are compared, each different ray being associated with a different trial convection velocity (in that the slope of a ray is assumed to be the flow velocity or correlated to the flow velocity in a known way). The convective ridge identifier 134 provides information about the different trial convection velocities, information referred to generally as convective ridge information.

The analyzer 136 examines the convective ridge information including the convective ridge orientation (slope). Assuming the straight-line dispersion relation given by k=ω/u, the analyzer 136 determines the flow velocity, Mach number and/or volumetric flow, which are output as parameters 21. The volumetric flow is determined by multiplying the cross-sectional area of the inside of the pipe with the velocity of the process flow.

Some or all of the functions within the flow logic 365 may be implemented in software (using a microprocessor or computer) and/or firmware, or may be implemented using analog and/or digital hardware, having sufficient memory, interfaces, and capacity to perform the functions described herein.

Speed of Sound (SOS) Processing

Figure 15:
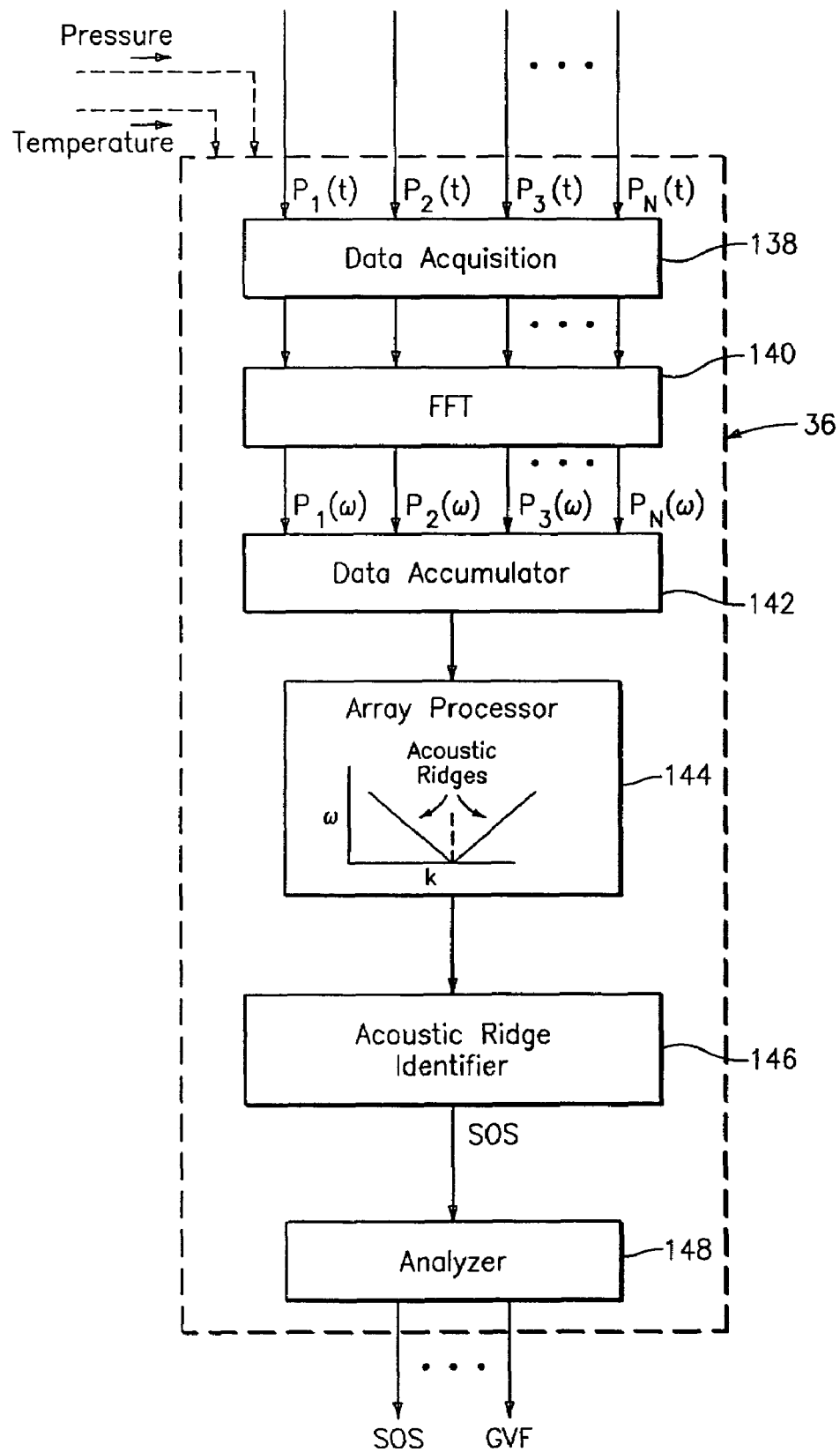
FIG. 15 is a block diagram of a second embodiment of a flow logic used in the apparatus of the present invention.
Figure 16:
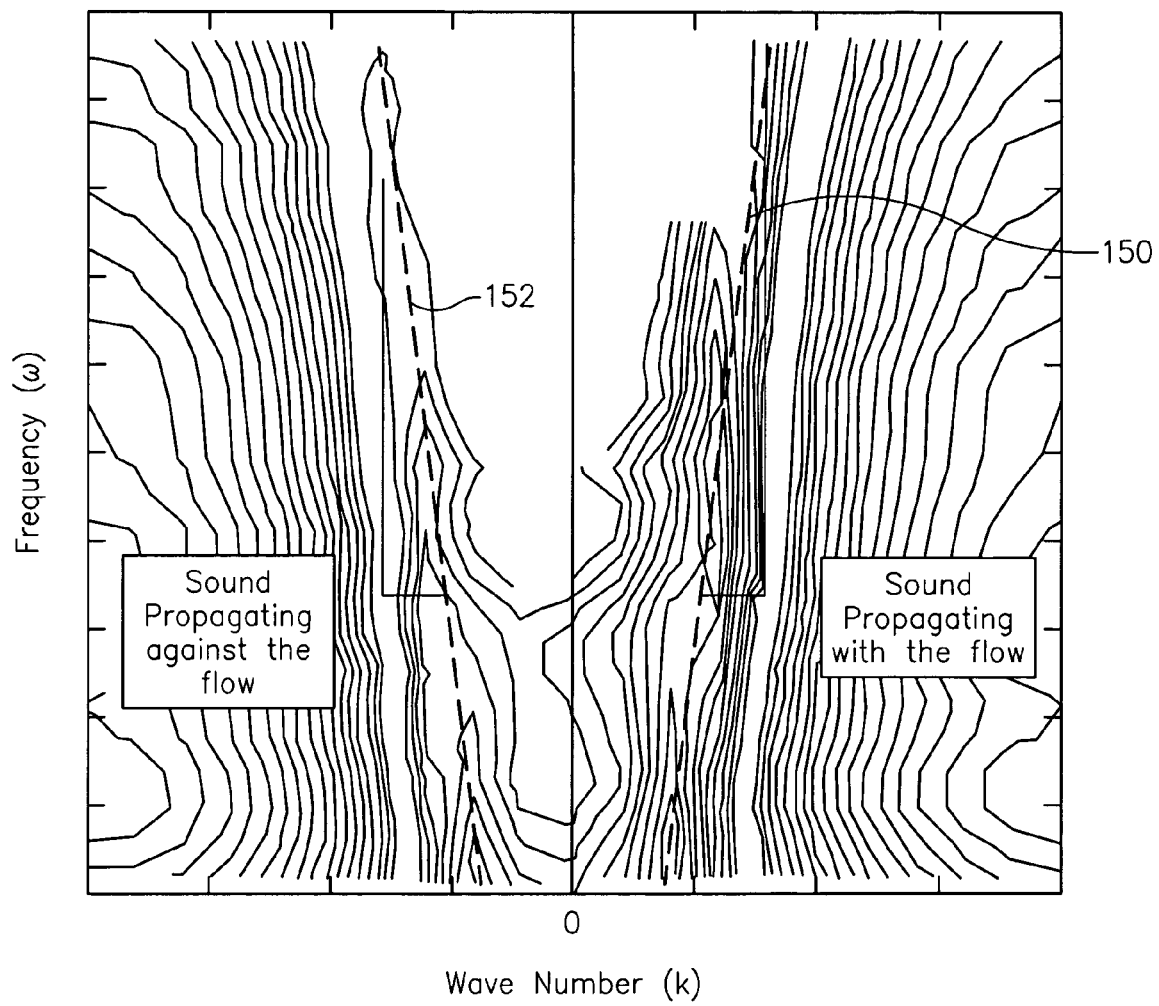
FIG. 16 a kω plot of data processed from an apparatus embodying the present invention that illustrates slope of the acoustic ridges.

Referring to FIG. 15, another example of flow logic 36 is shown. While the examples of FIGS. 15 and 16 are shown separately, it is contemplated that the flow logic 36 may perform all of the functions described with reference to FIGS. 15 and 16. As previously described, the array of at least two sensors located at two at least two locations $x_1, x_2$ axially along the pipe 14 sense respective stochastic signals propagating between the sensors within the pipe at their respective locations. Each sensor provides a signal indicating an unsteady pressure at the location of each sensor, at each instant in a series of sampling instants. One will appreciate that the sensor array may include more than two pressure sensors distributed at locations $x_1 \ldots x_N$. The pressure generated by the acoustic pressure disturbances (e.g., acoustic waves 122, see FIG. 13) may be measured through strained-based sensors and/or pressure sensors. The sensors provide analog pressure time-varying signals $P_1(t), P_2(t), P_3(t), P_N(t)$ to the flow logic 36. The flow logic 36 processes the signals $P_1(t), P_2(t), P_3(t), P_N(t)$ to first provide output signals indicative of the speed of sound propagating through the fluid (process flow) 13, and subsequently, provide output signals in response to pressure disturbances generated by acoustic waves propagating through the process flow 13, such as velocity, Mach number and volumetric flow rate of the process flow 13.

The flow logic 36 receives the pressure signals from the array of sensors 15-18. A data acquisition unit 138 digitizes pressure signals $P_1(t)-P_N(t)$ associated with the acoustic waves 122 propagating through the pipe 14. Similarly to the FFT logic 12 of FIG. 12, an FFT logic 140 calculates the Fourier transform of the digitized time-based input signals $P_1(t)-P_N(t)$ and provide complex frequency domain (or frequency based) signals $P_1(\omega), P_2(\omega), P_3(\omega), P_N(\omega)$ indicative of the frequency content of the input signals.

A data accumulator 142 accumulates the frequency signals $P_1(\omega)-P_N(\omega)$ over a sampling interval, and provides the data to an array processor 144, which performs a spatial-temporal (two-dimensional) transform of the sensor data, from the xt domain to the k-ω domain, and then calculates the power in the k-ω plane, as represented by a k-ω plot.

To calculate the power in the k-ω plane, as represented by a k-ω plot (see FIG. 16) of either the signals or the differenced signals, the array processor 144 determines the wavelength and so the (spatial) wavenumber k, and also the (temporal) frequency and so the angular frequency ω, of various of the spectral components of the stochastic parameter. There are numerous algorithms available in the public domain to perform the spatial/temporal decomposition of arrays of sensor units 15-18.

In the case of suitable acoustic waves 122 being present in both axial directions, the power in the k-ω plane shown in a k-ω plot of FIG. 16 so determined will exhibit a structure that is called an acoustic ridge 150, 152 in both the left and right planes of the plot, wherein one of the acoustic ridges 150 is indicative of the speed of sound traveling in one axial direction and the other acoustic ridge 152 being indicative of the speed of sound traveling in the other axial direction. The acoustic ridges represent the concentration of a stochastic parameter that propagates through the flow and is a mathematical manifestation of the relationship between the spatial variations and temporal variations described above. Such a plot will indicate a tendency for k-ω pairs to appear more or less along a line 150, 152 with some slope, the slope indicating the speed of sound.

The power in the k-ω plane so determined is then provided to an acoustic ridge identifier 146, which uses one or another feature extraction method to determine the location and orientation (slope) of any acoustic ridge present in the left and right k-ω plane. The velocity may be determined by using the slope of one of the two acoustic ridges 150, 152 or averaging the slopes of the acoustic ridges 150, 152.

Finally, information including the acoustic ridge orientation (slope) is used by an analyzer 148 to determine the flow parameters relating to measured speed of sound, such as the consistency or composition of the flow, the density of the flow, the average size of particles in the flow, the air/mass ratio of the flow, gas volume fraction of the flow, the speed of sound propagating through the flow, and/or the percentage of entrained air within the flow.

Similar to the array processor 132 of FIG. 12, the array processor 144 uses standard so-called beam forming, array processing, or adaptive array-processing algorithms, i.e. algorithms for processing the sensor signals using various delays and weighting to create suitable phase relationships between the signals provided by the different sensors, thereby creating phased antenna array functionality. In other words, the beam forming or array processing algorithms transform the time domain signals from the sensor array into their spatial and temporal frequency components, i.e. into a set of wave numbers given by $k=2\pi/\lambda$ where $\lambda$ is the wavelength of a spectral component, and corresponding angular frequencies given by $\omega=2\pi\nu$.

One such technique of determining the speed of sound propagating through the process flow 13 is using array processing techniques to define an acoustic ridge in the k-ω plane as shown in FIG. 16. The slope of the acoustic ridge is indicative of the speed of sound propagating through the process flow 13. The speed of sound (SOS) is determined by applying sonar arraying processing techniques to determine the speed at which the one dimensional acoustic waves propagate past the axial array of unsteady pressure measurements distributed along the pipe 14.

The flow logic 36 of the present embodiment measures the speed of sound (SOS) of one-dimensional sound waves propagating through the process flow 13 to determine the gas volume fraction of the process flow 13. It is known that sound propagates through various mediums at various speeds in such fields as SONAR and RADAR fields. The speed of sound propagating through the pipe 14 and process flow 13 may be determined using a number of known techniques, such as those set forth in U.S. patent application Ser. No. 09/344,094, filed Jun. 25, 1999, now U.S. Pat. No. 6,354,147; U.S. patent application Ser. No. 10/795,111, filed Mar. 4, 2004; U.S. patent application Ser. No. 09/997,221, filed Nov. 28, 2001, now U.S. Pat. No. 6,587,798; U.S. patent application Ser. No. 10/007,749, filed Nov. 7, 2001, and U.S. patent application Ser. No. 10/762,410, filed Jan. 21, 2004, each of which are incorporated herein by reference.

While the sonar-based flow meter using an array of sensors 15-18 to measure the speed of sound of an acoustic wave propagating through the mixture is shown and described, one will appreciate that any means for measuring the speed of sound of the acoustic wave may used to determine the entrained gas volume fraction of the mixture/fluid or other characteristics of the flow described hereinbefore.

The analyzer 148 of the flow logic 36 provides output parameters 21 indicative of characteristics of the process flow 13 that are related to the measured speed of sound (SOS) propagating through the process flow 13. For example, to determine the gas volume fraction (or phase fraction), the analyzer 148 assumes a nearly isothermal condition for the process flow 13. As such the gas volume fraction or the void fraction is related to the speed of sound by the following quadratic equation:

$$Ax^2+Bx+C=0$$

wherein x is the speed of sound, $A=1+rg/rl*(K_{eff}P-1)-K_{eff}/P$, $B=K_{eff}/P-2+rg/rl$; $C=1-K_{eff}/rl*a_{meas}{}^2$); Rg=gas density, rl=liquid density, $K_{eff}$=effective K (modulus of the liquid and pipewall), P=pressure, and $a_{meas}$=measured speed of sound.

Effectively, $$\text{Gas Voulume Fraction (GVF)}=(-B+sqrt(B^2-4*A*C))/(2*A)$$

Alternatively, the sound speed of a mixture can be related to volumetric phase fraction ($\phi_i$) of the components and the sound speed (a) and densities ($\rho$) of the component through the Wood equation.

$$\frac{1}{\rho_{mix}a_{mix\infty}^2}=\sum_{i=1}^{N}\frac{\phi_i}{\rho_i a_i^2} \text{ where } \rho_{mix}=\sum_{i=1}^{N}\rho_i\phi_i$$

One dimensional compression waves propagating within a process flow 13 contained within a pipe 14 exert an unsteady internal pressure loading on the pipe. The degree to which the pipe displaces as a result of the unsteady pressure loading influences the speed of propagation of the compression wave. The relationship among the infinite domain speed of sound and density of a mixture; the elastic modulus (E), thickness (t), and radius (R) of a vacuum-backed cylindrical conduit; and the effective propagation velocity ($a_{eff}$) for one dimensional compression is given by the following expression:

$$a_{eff}=\frac{1}{\sqrt{1/a_{mix\infty}^2+\rho_{mix}\frac{2R}{Et}}} \quad \text{(eq 1)}$$

Figure 17:
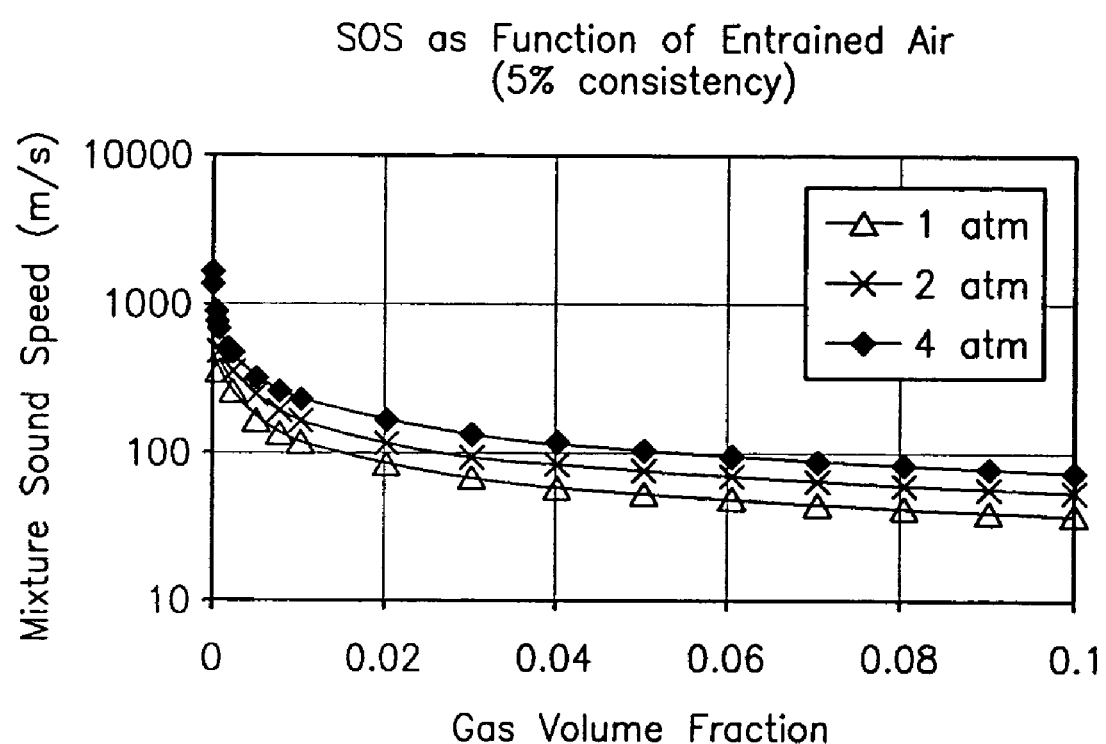
FIG. 17 is a plot of mixture sound speed as a function of gas volume fraction for a 5% consistency slurry over a range of process pressures.

The mixing rule essentially states that the compressibility of a process flow ($1/(\rho a^2)$) is the volumetrically-weighted average of the compressibilities of the components. For a process flow 13 consisting of a gas/liquid mixture at pressure and temperatures typical of paper and pulp industry, the compressibility of gas phase is orders of magnitudes greater than that of the liquid. Thus, the compressibility of the gas phase and the density of the liquid phase primarily determine mixture sound speed, and as such, it is necessary to have a good estimate of process pressure to interpret mixture sound speed in terms of volumetric fraction of entrained gas. The effect of process pressure on the relationship between sound speed and entrained air volume fraction is shown in FIG. 17.

As described hereinbefore, the flow logic 36 of the present embodiment includes the ability to accurately determine the average particle size of a particle/air or droplet/air mixture within the pipe 14 and the air to particle ratio. Provided there is no appreciable slip between the air and the solid coal particle, the propagation of one dimensional sound wave through multiphase mixtures is influenced by the effective mass and the effective compressibility of the mixture. For an air transport system, the degree to which the no-slip assumption applies is a strong function of particle size and frequency. In the limit of small particles and low frequency, the no-slip assumption is valid. As the size of the particles increases and the frequency of the sound waves increase, the non-slip assumption becomes increasing less valid. For a given average particle size, the increase in slip with frequency causes dispersion, or, in other words, the sound speed of the mixture to change with frequency. With appropriate calibration the dispersive characteristic of a process flow 13 will provide a measurement of the average particle size, as well as, the air to particle ratio (particle/fluid ratio) of the process flow 13.

In accordance with the present invention the dispersive nature of the system utilizes a first principles model of the interaction between the air and particles. This model is viewed as being representative of a class of models that seek to account for dispersive effects. Other models could be used to account for dispersive effects without altering the intent of this disclosure (for example, see the paper titled "Viscous Attenuation of Acoustic Waves in Suspensions" by R. L. Gibson, Jr. and M. N. Toksöz), which is incorporated herein by reference. The model allows for slip between the local velocity of the continuous fluid phase and that of the particles.

The following relation can be derived for the dispersive behavior of an idealized fluid particle mixture.

$$a_{mix}(\omega) = a_f \sqrt{\frac{1}{1 + \frac{\varphi_p \rho_p}{\rho_f \left(1 + \omega^2 \frac{\rho_p^2 v_p^2}{K^2}\right)}}}$$

In the above relation, the fluid SOS, density ($\rho$) and viscosity ($\phi$)) are those of the pure phase fluid, $v_p$ is the volume of individual particles and $\phi_p$ is the volumetric phase fraction of the particles in the mixture.

Figure 18:
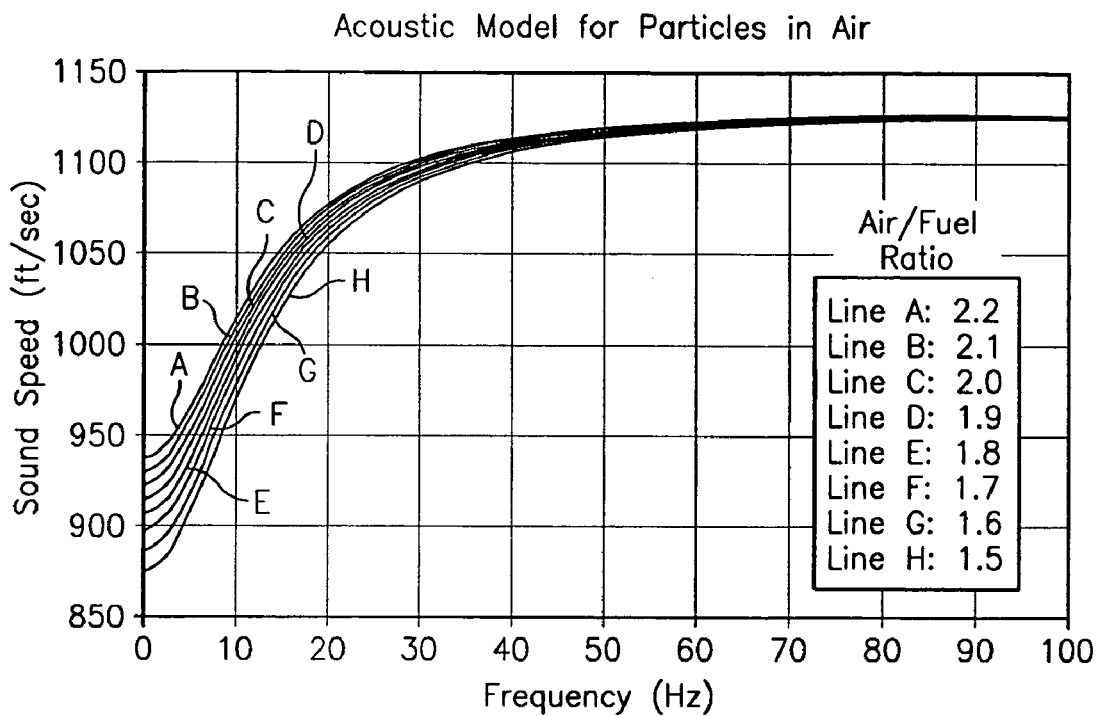
FIG. 18 is a plot of sound speed as a function of frequency for air/particle mixtures with fixed particle size and varying air-to-particle mass ratio.
Figure 19:
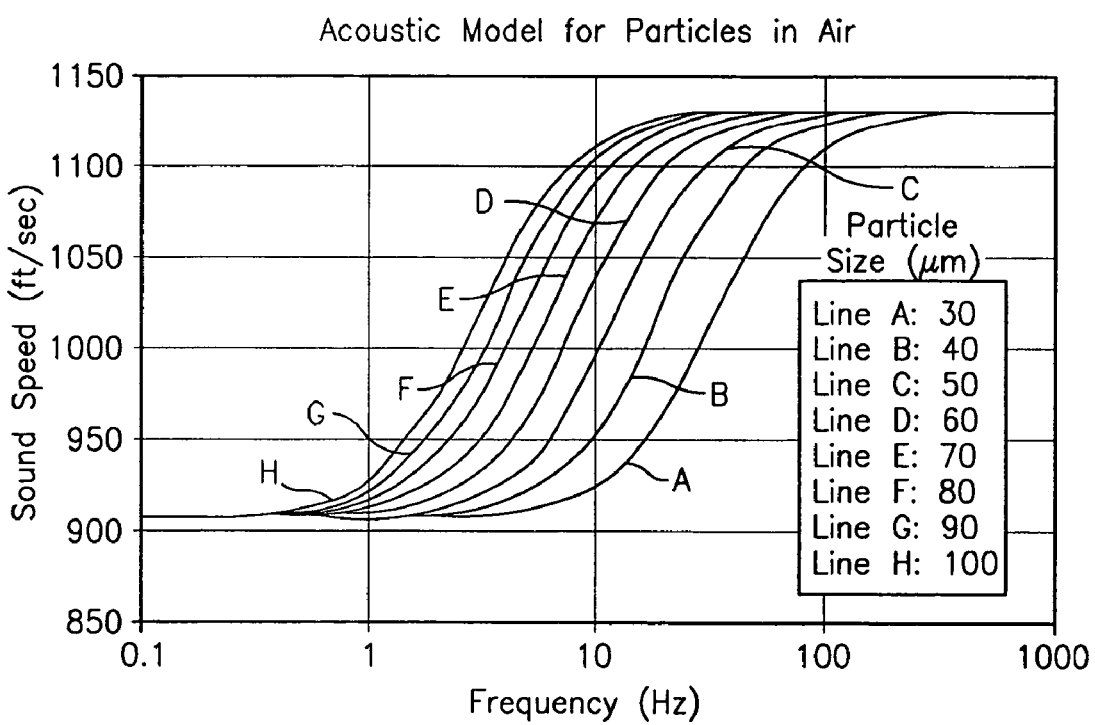
FIG. 19 is a plot of sound speed as a function of frequency for air/particle mixtures with varying particle size where the air-to-particle mass ratio is fixed.

Two parameters of particular interest in steam processes and air-conveyed particles processes are particle size and air-to-fuel mass ratio or steam quality. To this end, it is of interest to examine the dispersive characteristics of the mixture as a function of these two variables. FIGS. 18 and 19 show the dispersive behavior in relations to the speed of sound for coal/air mixtures with parameters typical of those used in pulverized coal deliver systems.

In particular FIG. 18 shows the predicted behavior for nominally 50 μm size coal in air for a range of air-to-fuel ratios. As shown, the effect of air-to-fuel ratio is well defined in the low frequency limit. However, the effect of the air-to-fuel ratio becomes indistinguishable at higher frequencies, approaching the sound speed of the pure air at high frequencies (above ~100 Hz).

Similarly, FIG. 19 shows the predicted behavior for a coal/air mixture with an air-to-fuel ratio of 1.8 with varying particle size. This figure illustrates that particle size has no influence on either the low frequency limit (quasi-steady) sound speed, or on the high frequency limit of the sound speed. However, particle size does have a pronounced effect in the transition region.

FIGS. 8 and 9 illustrate an important aspect of the present invention. Namely, that the dispersive properties of dilute mixtures of particles suspended in a continuous liquid can be broadly classified into three frequency regimes: low frequency range, high frequency range and a transitional frequency range. Although the effect of particle size and air-to-fuel ratio are inter-related, the predominant effect of air-to-fuel ratio is to determine the low frequency limit of the sound speed to be measured and the predominate effect of particle size is to determine the frequency range of the transitional regions. As particle size increases, the frequency at which the dispersive properties appear decreases. For typical pulverized coal applications, this transitional region begins at fairly low frequencies, ~2 Hz for 50 μm size particles.

Given the difficulties measuring sufficiently low frequencies to apply the quasi-steady model and recognizing that the high frequency sound speed contains no direct information on either particle size or air-to-fuel ratio, it becomes apparent that the dispersive characteristics of the coal/air mixture should be utilized to determine particle size and air-to-fuel ratio based on speed of sound measurements.

Some or all of the functions within the flow logic 36 may be implemented in software (using a microprocessor or computer) and/or firmware, or may be implemented using analog and/or digital hardware, having sufficient memory, interfaces, and capacity to perform the functions described herein.

While FIGS. 12 and 15 depict two different embodiments of the flow logic 36 to measure various parameters of the flow process, the present invention contemplates that the functions of these two embodiments may be performed by a single flow logic 36.

The present invention provides a system of one or more configurable flowmeters that allows an individual, locally or remotely, to selectively activate one or more functions of the flowmeter. The present invention also provides a system that allows an individual, locally or remotely, to selectively activate one or more latent flowmeters in the system. While various flowmeters are described herein as having configurable functions, it is contemplated that the flowmeters described herein may be selectable only to turn them on or off (e.g., latent/activated). Similarly, the flowmeters described herein may be only configurable, having functions that may be configured, but not being selectable to turn on/off. Furthermore, it is contemplated that the flowmeters described herein may be configurable (e.g., various functions) and selectable (e.g., on/off).

The system of configurable flowmeters may be a distributed control system (DCS), which receives input signals from conventional meters and devices in the process flow. The system also provides a method of flowmeter selection and billing. Such a system allows the user to install latent (or dormant) flowmeters when the plant is built (or at a later time) that are accessed by the user only when they are needed, thereby saving significant expense later in the life of the plant equipment or developing needs when more or different flowmeters and/or parameters are needed to be sensed by the user. The invention also allows for automatic flowmeter selection reconfiguration without user intervention.

It should be understood that, unless otherwise stated herein, any of the features, characteristics, alternatives or modifications described regarding a particular embodiment herein may also be applied, used, or incorporated with any other embodiment described herein.

Although the invention has been described and illustrated with respect to exemplary embodiments thereof, the foregoing and various other additions and omissions may be made therein and thereto without departing from the spirit and scope of the present invention.

What is claimed is:

1. A system comprising:
    a plurality of sensor heads, each of the sensor heads comprising an array of sensors disposed axially along a pipe, and each of the sensor heads providing pressure signals representative of pressures within a fluid flowing in the pipe; and
    at least one signal processor configured to receive pressure signals from the plurality of sensor heads, and also configured to receive a selection signal containing information about a selection of at least one parameter determined from the pressure signals provided from selected ones of the plurality of sensor heads, the at least one signal processor configured to provide an output signal indicative of at least one selected parameter determined from the pressure signals from the selected ones of the plurality of sensor heads.

2. The system of claim 1, wherein the selection signal is indicative of a user's desire to output a particular parameter from a select sensor head.

3. The system of claim 1, wherein the status of the selection signal is indicative of an output signal paid by a user.

4. The system of claim 1, wherein the selection signal is provided from a location remote from the at least one signal processor.

5. The system of claim 1, wherein the selection signal is provided from a location remote from the at least one signal processor via a remote link.

6. The system of claim 5, wherein the remote link comprises an Internet link.

7. The system of claim 1, wherein the output signal is provided to a location remote from the at least one signal processor via a remote link.

8. The system of claim 1, wherein a user of the system is charged a fee based at least in part on the selected ones of the plurality of sensor heads.

9. The system of claim 1, wherein a user of the system is charged a fee based at least in part on the output signal.

10. The system of claim 1, wherein the at least one selected parameter is selected from a plurality of parameters determined from the pressure signals from the selected ones of the plurality of sensor heads.

11. The system of claim 10, wherein the at least one signal processor selects the selected ones of the plurality of sensor heads and the at least one parameter based on a selection signal.

12. The system of claim 10, wherein a user of the system is charged a fee based at least in part on the at least one parameter selected.

13. The system of claim 1, wherein the at least one signal processor includes:
at least one first signal processor connected to the plurality of sensor heads, the at least one first signal processor determines the at least one parameter; and
a second signal processor that selects the selected ones of the plurality of sensor heads.

14. The system of claim 13, wherein each of the sensor heads has an associated first signal processor.

15. The system of claim 13, wherein, in response to the at least one selected parameter, the second signal processor provides a control signal to a device through which the fluid flows.

16. A system according to claim 1, wherein the at least one selected parameter is selected from a plurality of parameters determined from the pressure signals.

17. The system of claim 16, wherein the pressures within the fluid are unsteady pressures.

18. The system of claim 17, wherein the pressures are convective disturbances, vortical disturbances, and/or acoustic disturbances.

19. The system of claim 1, wherein the at least one selected parameter is a parameter of a fluid flowing within at least one pipe.

20. The system of claim 19, wherein the at least one selected parameter of the fluid includes at least one of: density of the fluid, volumetric flow rate of the fluid, mass flow rate of the fluid, composition of the fluid, entrained air in the fluid, consistency of the fluid, and size of particles in the fluid.

21. The system of claim 1, wherein the at least one selected parameter is indicative of the health of a device associated with the fluid flow.

22. The system of claim 21, wherein the device is one of a motor, fan, pump, generator, engine, gearbox, belt, drive, pulley, hanger, clamp, actuator, valve, and meter.

23. The system of claim 1, wherein each of the plurality of sensor heads is configured to measure pressures in different pipes.

24. The system of claim 1, wherein each of the plurality of sensor heads is configured to measure pressures in the same pipe at different axial locations.

25. The system of claim 1, wherein the pressures within the fluid are unsteady pressures.

26. The system of claim 25, wherein the pressures are convective disturbances, vortical disturbances, and/or acoustic disturbances.

27. A method of sensing the fluid flowing through at least one pipe, the method comprising:
measuring pressures within a fluid flowing in the at least one pipe using a plurality of sensor heads, each of the sensor heads comprising an array of sensors disposed axially along a pipe, and each of the sensor heads providing pressure signals representative of pressures within the fluid flowing in the at least one pipe;
receiving the pressure signals from the plurality of sensor heads;
determining at least one parameter from the pressure signals from a selected one of the plurality of sensor heads, in response to a selection signal; and
storing the at least one parameter in memory and/or communicating the at least one parameter to a user.

28. A method of sensing the fluid flowing through at least one pipe, the method comprising:
measuring pressures within a fluid flowing in the at least one pipe using a plurality of sensor heads, each of the sensor heads comprising an array of sensors disposed axially along a pipe, and each of the sensor heads providing pressure signals representative of pressures within the fluid flowing in the at least one pipe;
receiving the pressure signals from the plurality of sensor heads;
determining at least one parameter from the pressure signals wherein the at least one parameter being selected from a plurality of parameters determined from the pressure signals, in response to a selection signal; and
storing the at least one parameter in memory and/or communicating the at least one parameter to a user.

29. A signal processor comprising:
one or more modules configured to receive pressure signals containing information representative of pressures within a fluid flowing in a pipe from a plurality of sensor heads disposed axially along the pipe, configured to receive a selection signal containing information about a selection of at least one parameter determined from the pressure signals provided from selected ones of the plurality of sensor heads, and also configured to provide an output signal indicative of at least one selected parameter determined from the pressure signals from the selected ones of the plurality of sensor heads.

30. The signal processor of claim 29, wherein the selection signal is indicative a user's desire to output a particular parameter from a select sensor head.

31. The signal processor of claim 29, wherein the selection signal is indicative of an output signal paid by a user.

32. The signal processor of claim 29, wherein the selection signal is provided from a location remote from the at least one signal processor.

33. The signal processor of claim 29, wherein the selection signal is provided from a location remote from the at least one signal processor via a remote link.

34. The signal processor of claim 33, wherein the remote link comprises an Internet link.

35. The signal processor of claim 29, wherein the output signal is provided to a location remote from the at least one signal processor via a remote link.

36. The signal processor of claim 29, wherein the signal processor forms part of a system, and a user of the system is charged a fee based at least in part on the at least one parameter selected.

37. The signal processor of claim 29, wherein a user of the system is charged a fee based at least in part on the output signal.

38. The signal processor of claim 29, wherein the signal processor includes:

at least one first signal processor connected to the plurality of sensor heads, the at least one first signal processor determines the at least one parameter; and a second signal processor that selects the at least one parameter.

39. The signal processor of claim 38, wherein each of the plurality of sensor heads has an associated first signal processor.

40. The signal processor of claim 38, wherein, in response to the at least one selected parameter, the second signal processor provides a control signal to a device through which the fluid flows.

41. The signal processor of claim 29, wherein the at least one selected parameter is a parameter of a fluid flowing within at least one pipe.

42. The signal processor of claim 41, wherein the at least one parameter of the fluid includes at least one of: density of the fluid, volumetric flow rate of the fluid, mass flow rate of the fluid, composition of the fluid, entrained air in the fluid, consistency of the fluid, and size of particles in the fluid.

43. The signal processor of claim 29, wherein the at least one selected parameter is indicative of the health of a device associated with the fluid flow.

44. The signal processor of claim 43, wherein the device is one of a motor, fan, pump, generator, engine, gearbox, belt, drive, pulley, hanger, clamp, actuator, valve, and meter.

45. The signal processor of claim 29, wherein each of the plurality of sensor heads is configured to measure pressures in different pipes.

46. The signal processor of claim 29, wherein each of the plurality of sensor heads is configured to measure pressures in the same pipe at different axial locations.

* * * * *

UNITED STATES PATENT AND TRADEMARK OFFICE
CERTIFICATE OF CORRECTION

PATENT NO. : 7,623,976 B2 Page 1 of 1
APPLICATION NO. : 10/875858
DATED : November 24, 2009
INVENTOR(S) : Gysling et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 218 days.

Signed and Sealed this

Fourteenth Day of December, 2010

David J. Kappos
*Director of the United States Patent and Trademark Office*

UNITED STATES PATENT AND TRADEMARK OFFICE
CERTIFICATE OF CORRECTION

PATENT NO. : 7,623,976 B2
APPLICATION NO. : 10/875858
DATED : November 24, 2009
INVENTOR(S) : D. L. Gysling et al.

Page 1 of 1

It is certified that error appears in the above-identified patent and that said Letters Patent is hereby corrected as shown below:

On the title page under "References Cited, U.S. Patent Documents", item [56] add --U.S. Patent No. 6,016,702, Gysling et al., 01/2000--.

In the Specification

In column 14 at line 15, "×" should be -- - --.

In column 14 at line 64, "kw" should be --k-w--.

In column 16 at line 13, "12" should be --128--.

Signed and Sealed this
Twentieth Day of August, 2013

Teresa Stanek Rea
*Acting Director of the United States Patent and Trademark Office*